United States Patent
Fregly et al.

(10) Patent No.: US 11,785,114 B1
(45) Date of Patent: Oct. 10, 2023

(54) CACHING PROXY FOR A DIGITAL OBJECT ARCHITECTURE

(71) Applicant: VERISIGN, INC., Reston, VA (US)

(72) Inventors: Andrew Fregly, Reston, VA (US); Najmehalsadat Miramirkhani, Stony Brook, NY (US); Swapneel Sheth, Fairfax, VA (US)

(73) Assignee: VeriSign, Inc., Reston, VA (US)

( * ) Notice: Subject to any disclaimer, the term of this patent is extended or adjusted under 35 U.S.C. 154(b) by 436 days.

(21) Appl. No.: 16/041,630

(22) Filed: Jul. 20, 2018

(51) Int. Cl.
*H04L 29/06* (2006.01)
*H04L 9/30* (2006.01)
*H04L 67/568* (2022.01)
*H04L 9/40* (2022.01)

(52) U.S. Cl.
CPC ........... *H04L 67/568* (2022.05); *H04L 9/30* (2013.01); *H04L 63/0281* (2013.01); *H04L 63/0442* (2013.01); *H04L 63/10* (2013.01)

(58) Field of Classification Search
CPC ..... G05B 1/00; G06F 7/00; H04L 9/00; G06Q 10/00; H04L 67/2842; H04L 9/30; H04L 63/0281; H04L 63/10
See application file for complete search history.

(56) References Cited

U.S. PATENT DOCUMENTS

| | | | | |
|---|---|---|---|---|
| 7,739,301 B2* | 6/2010 | Bojinov et al. | ........ | G06F 21/64 707/782 |
| 2002/0156737 A1* | 10/2002 | Kahn et al. | ............ | G06Q 10/10 705/51 |

(Continued)

FOREIGN PATENT DOCUMENTS

| | | | | |
|---|---|---|---|---|
| WO | 2016054149 A1* | 4/2016 | ................. | G06F 21/33 |

OTHER PUBLICATIONS

"DO Repository", CNRI Digital Object Repository Retrieved from http://www.dorepository.org, Feb. 2, 2016, 2 pages.
"Framework for discovery of identity management information", ITU-T X.1255. ITU, Sep. 4, 2013, 34 pages.
"Handle.Net Registry" Retrieved from: https://web.archive.org/web/20180707043930/http://www.handle.net/, Jul. 7, 2018, 1 page.
"info:hdl/", Retrieved from http://info-uri.info/registry/OAIHandler?verb=GetRecord&metadataPrefix=reg&identifier=info:hdl/. Info URI Registry, Dec. 7, 2005, 3 pages.

(Continued)

*Primary Examiner* — Beemnet W Dada
*Assistant Examiner* — Leynna Truvan
(74) *Attorney, Agent, or Firm* — McCarter & English, LLP; Michael A. Sartori, Ph.D.

(57) ABSTRACT

A digital object architecture infrastructure includes a handle system that stores handle data and a proxy server that caches handle data for rapid access. A client connects to the proxy server to request access to the handle data. When the handle data does not have access restrictions and is currently cached, the proxy server returns the handle data to the client without accessing the handle system. When the handle data does not have access restrictions and is not cached, the proxy server obtains the handle data from the handle system, caches a copy of the handle data for future access, and provides the handle data to the client. The proxy server may cache encrypted handle data that is subject to access restrictions, cannot be decrypted by proxy server, and can be provided to a client determined to be allowed access. The client can then decrypt the encrypted handle data.

20 Claims, 16 Drawing Sheets

(56) References Cited

U.S. PATENT DOCUMENTS

2008/0040484 A1* 2/2008 Yardley .............. H04L 67/142
　　　　　　　　　　　　　　　　　　　　　　　709/227

OTHER PUBLICATIONS

"Multicast encryption - Wikipedia", Retrieved from https://en.wikipedia.org/wiki/Multicast_encryption, (last edited Jan. 29, 2018), 2 pages.

CNRI Digital Object Registry Retrieved from http://www.doregistry.org, Aug. 3, 2015, 2 pages.

Duan et al., "How to Construct Multicast Cryptosystems Provably Secure Against Adaptive Chosen Ciphertext Attack". CT-RSA 2006, LNCS 3860, pp. 244-261.

Durand et al.,"DOA over DNS", IETF, Retrieved from https://tools.ietf.org/id/draft-durand-doa-over-dns-02.html, Jul. 25, 2017, 6 pages.

Kahn et al., "A Framework for Distributed Digital Object Services" International Journal on Digital Libraries, vol. 6, No. 2, Mar. 13, 2006, pp. 115-123.

Mukherjee et al., "Multicast Group Authentication", 2005, IFIP, 16 pages.

Okamoto et al., "Almost uniform density of power residues and the provable security of ESIGN", ASIACRYPT Sep. 15, 2003, 15 pages.

Opayinka et al., "A robust multicast authentication scheme based on asymmetric key signature", The 9th International Conference for Internet Technology and Secured Transactions (ICITST-2014). IEEE, pp. 449-458.

Reilly et al., "Digital Object Repository Server: A Component of the Digital Object Architecture" D-Lib Magazine, vol. 16, No. 1/2. Retrieved from www-dlib.org/dlib/january10/reilly/01.reilly.html, Jan.-Feb. 2010, 7 pages.

Sun et al., "Handle System Namespace and Service Definition" RFC 3651, CNRI, Nov. 2003, pp. 1-41.

Sun et al., "Handle System Overview" RFC 3650, CNRI, Nov. 2003, pp.1-21.

Sun et al., "Handle System Protocol (ver. 2.1) Specification" RFC 3652, CNRI, Nov. 2003, pp.1-53.

Zhang et al., "Named Data Networking (NDN) Project", Technical Report, NDN, Technical Report NDN-0001, retrieved from http://named-data.net/techreports.html, Oct. 31, 2010, 26 pages.

* cited by examiner

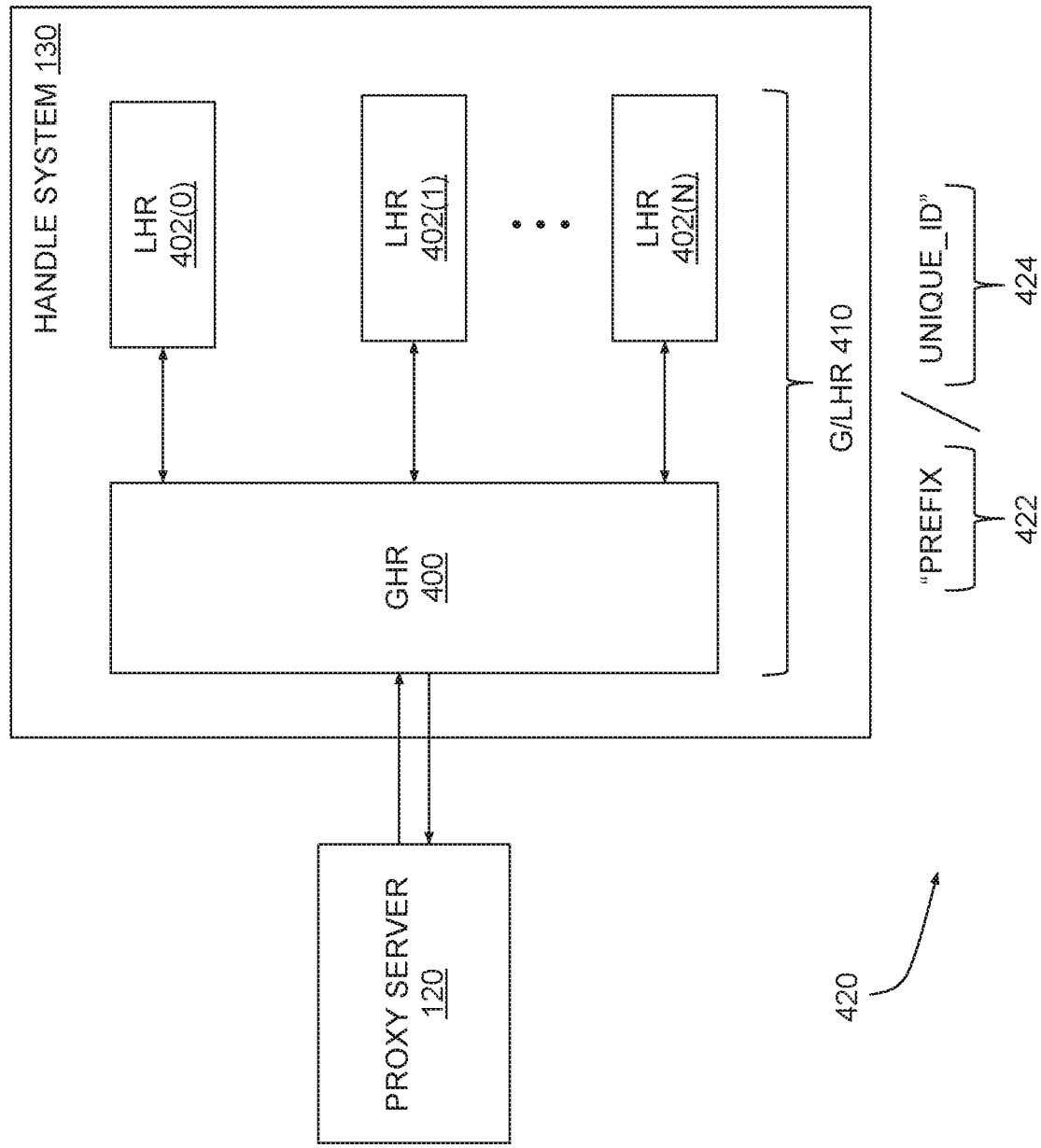

CACHING PROXY FOR A DIGITAL OBJECT ARCHITECTURE

BACKGROUND

Field of the Various Embodiments

The various embodiments relate generally to Internet infrastructure and, more specifically, to a caching proxy for a digital object architecture.

Description of the Related Art

The World Wide Web includes a multitude of interconnected web servers that store and provide access to various types of digital resources, including web pages, images, movie files, documents, and so forth. A user of the World Wide Web may access a given digital resource (including digital objects) via a uniform resource locator (URL). The URL includes a domain name corresponding to the web server that stores the digital resource and a path segment indicating the location of the digital resource on that web server. When the user accesses the URL via a browser, the browser uses domain name system (DNS) resolution to map the domain name portion of the URL to an internet protocol (IP) address corresponding to the web server. The browser then connects to the web server using that IP address and submits a request for the digital resource to the web server. The request includes the path segment portion of the URL. The web server retrieves the digital resource using the path segment and, finally, returns the digital resource to the user via the browser.

If the digital resource is moved to a different location on the web server, moved to a different web server, or removed from the web server altogether, then the associated URL can no longer be used to access the digital resource. One consequence of this particular issue is that many web servers and corresponding web pages are associated with URLs that cannot be used to access underlying digital resources and are therefore considered to be "broken."

To address the problem of broken URLs, a digital object identifier approach has been defined as part of the digital object architecture (DOA). In the context of DOA, the term "digital object" may refer to, for example, any type of data having any format and, in some cases, any associated metadata, that is stored within a DOA infrastructure. For example, and without limitation, a given digital object could be a Unicode text file, a Motion Picture Experts Group (MPEG) movie, a Portable Document Format (PDF) document, a Portable Network Graphics (PNG) image, a JavaScript Object Notation (JSON) object, a server location, a service endpoint, an IoT device address, or any combination of such data.

The digital object identifier approach mentioned above provides a technique for tracking and maintaining digital objects within the World Wide Web. The tracking technique may use, for example, a unique "handle identifier" (handle ID) to identify a digital object and have these identifiers registered into globally accessible handle registries. Registered handle IDs can then serve as lookup keys into handle registries to identify handle registry entries (also referred to as handle data) that provide the current location in a handle registry of the digital object associated with a handle ID. This approach allows the current location of a digital object to be retrieved from a handle registry so long as the handle data for the digital object is updated with the location of the digital object when that location changes. The result of this approach is that handle IDs serve as permanent identifiers for use in retrieving digital objects. This addresses the "broken" URL problem that can occur when URLs are used as digital object identifiers.

Handle data for digital objects may include identifying information, such as personally identifying information (PII), related to the digital object owner or the owner of the handle data. Handle registries may protect disclosure of identifying information by supporting the use of restricted access policy enforcement to prevent this identifying information, such as PII, from being publicly disseminated by restricting access to only authorized users. Handle data may also require restricted access policies for other reasons as well. Accordingly, in order to access handle data for certain digital objects, a user may be required to first complete an authentication and authorization process. Restricted content of handle data may not easily be stored in a cache because conventional caching approaches may not be able to honor the access restrictions. Without caching of handle data, DOA may not be able to provide efficient access to digital objects in the DOA.

As the foregoing illustrates, what is needed in the art is an effective technique for caching handle data within the DOA infrastructure.

SUMMARY

According to an embodiment, a computer-implemented method for caching handle data is provided that has access restrictions, including determining that access to first handle data is restricted based on a first request received from a first client machine, determining that the first client machine is authorized to access the first handle data, in response, retrieving an encrypted version of the first handle data based on a handle identifier included in the first request, and storing the encrypted version of the first handle data in a first cache memory for subsequent access by the first client machine or by one or more other client machines.

For example, a DOA infrastructure that includes a proxy server can provide access to digital resources with good efficiencies.

BRIEF DESCRIPTION OF THE DRAWINGS

So that the manner in which the above recited features can be understood in detail, a more particular description of the various embodiments, briefly summarized above, may be had by reference to certain embodiments, some of which are illustrated in the appended drawings. It is to be noted, however, that the appended drawings illustrate only typical embodiments and are therefore not to be considered limiting of scope, for the contemplated embodiments may admit to other equally effective embodiments.

FIG. 4 is a more detailed illustration of the handle system of FIG. 1, according to various embodiments;

DETAILED DESCRIPTION

The descriptions of the various embodiments have been presented for purposes of illustration and are not intended to be exhaustive or limited in any way. Many modifications and variations will be apparent to those of ordinary skill in the art without departing from the scope and spirit of the described embodiments.

As discussed above, because some handle data may have access restrictions that require a user to be authenticated and authorized, conventional implementations of digital object architecture (DOA) typically do not perform caching techniques.

To address this problem, various embodiments include a proxy server capable of and configured for caching handle data while also honoring access restrictions for handle data in a secure fashion. According to an embodiment, the proxy server may implement a number of different caching models independently or in conjunction with one another. In some embodiments described herein, caching, encryption and decryption processing techniques allow the proxy server to cache encrypted handle data or relay encrypted handle data to clients without the proxy server having access to a decryption key that would allow proxy server to decrypt encrypted handle data. These techniques may prevent a compromised proxy server from being able to decrypt and expose decrypted handle data to unauthorized parties.

System Overview

Figure 1:
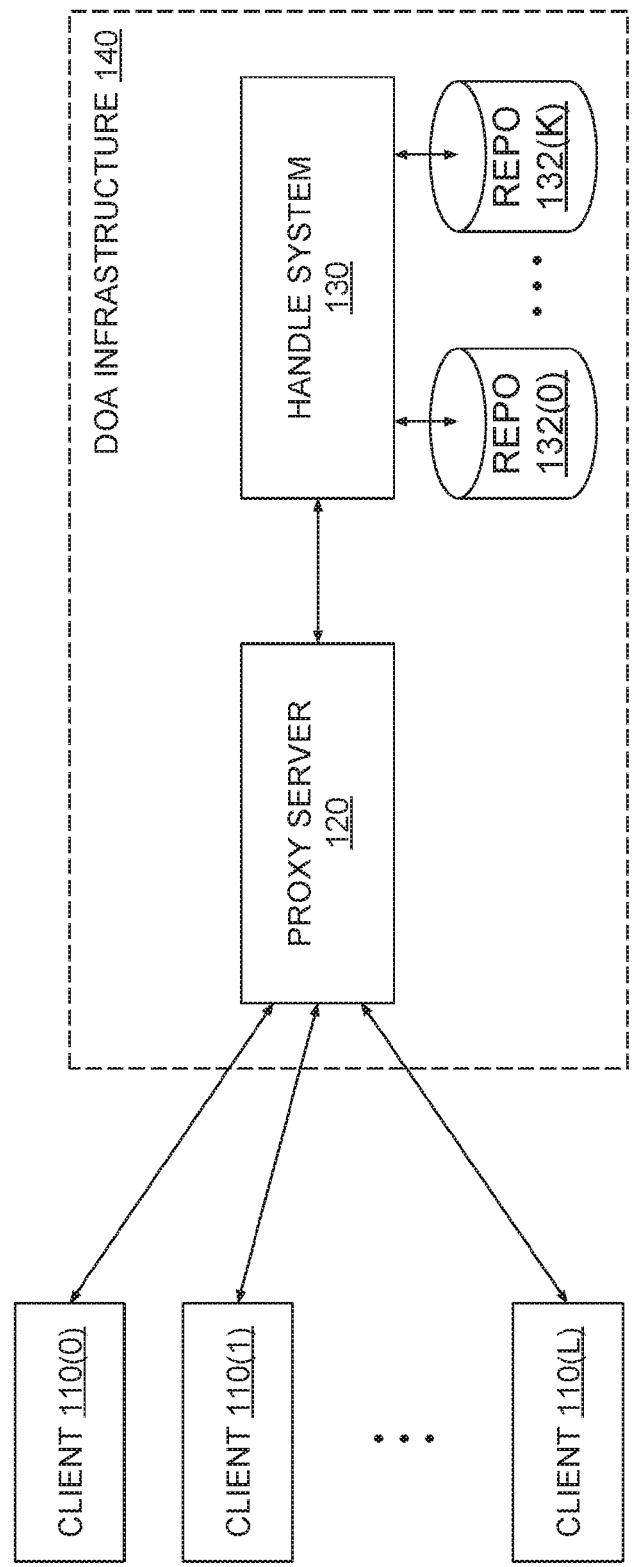
FIG. 1 illustrates a system configured to implement one or more aspects of the various embodiments.

FIG. 1 illustrates a system configured to implement one or more aspects of the various embodiments. As shown, system 100 includes a set of client machines (shown as clients) 110 coupled with a proxy server 120. Proxy server 120 is coupled with a handle system 130 that is coupled to repositories 132. Proxy server 120, handle system 130, and repositories (shown as repos) 132 may form a portion of a DOA infrastructure 140. Each client 110 may be, for example, a computing device that is associated with a user and coupled to the Internet. According to an embodiment, a client 110, such as client 110(0), 110(1), or 110(L), executes client software configured to access proxy server 120 via an Internet connection. An exemplary client 110 is discussed in greater detail below in conjunction with FIG. 2.

Proxy server 120 may be, for example, a computing device that caches handle data for expeditious access. Proxy server 120 may perform various authentication and authorization operations on behalf of clients 110 in order to provide access to handle data having access restrictions. For example, proxy server 120 is described in greater detail below in conjunction with FIG. 3. Handle system 130 may include a hierarchy of computing devices configured to act as handle registries and to manage the storage of digital objects and associated handle data. While the embodiments described herein describe caching models related to caching handle data, those with ordinary skill in the art could apply these caching models more generally to proxy servers for other types of digital data subject to access policy requirements or encryption requirements.

As referred to herein, a "digital object" broadly refers to, for example, any technically feasible type of data included in a DOA infrastructure. For example, and without limitation, a given digital object could be a Unicode text file, a Motion Picture Experts Group (MPEG) movie, a Portable Document Format (PDF) document, a Portable Network Graphics (PNG) image, a JavaScript Object Notation (JSON) object, a server address, a service endpoint, and any combination thereof. For example, repositories 132 may store digital objects.

A digital object may be associated with "handle data." Handle data is a form of metadata that may include, for example, records related to how and where the digital object is stored and how the digital object may be accessed. For example, and without limitation, handle data associated with a digital object may include IP addresses, location data, path segments, access control lists, permissions settings, ownership data, allowed access methods, and state variables, among other data related to the digital object. Proxy server 120 interacts with handle system 130 to retrieve handle data stored therein. Then, proxy server 120 may store cached versions of this handle data using a variety of different techniques described in greater detail below in conjunction with FIGS. 5A-12.

Figure 2:
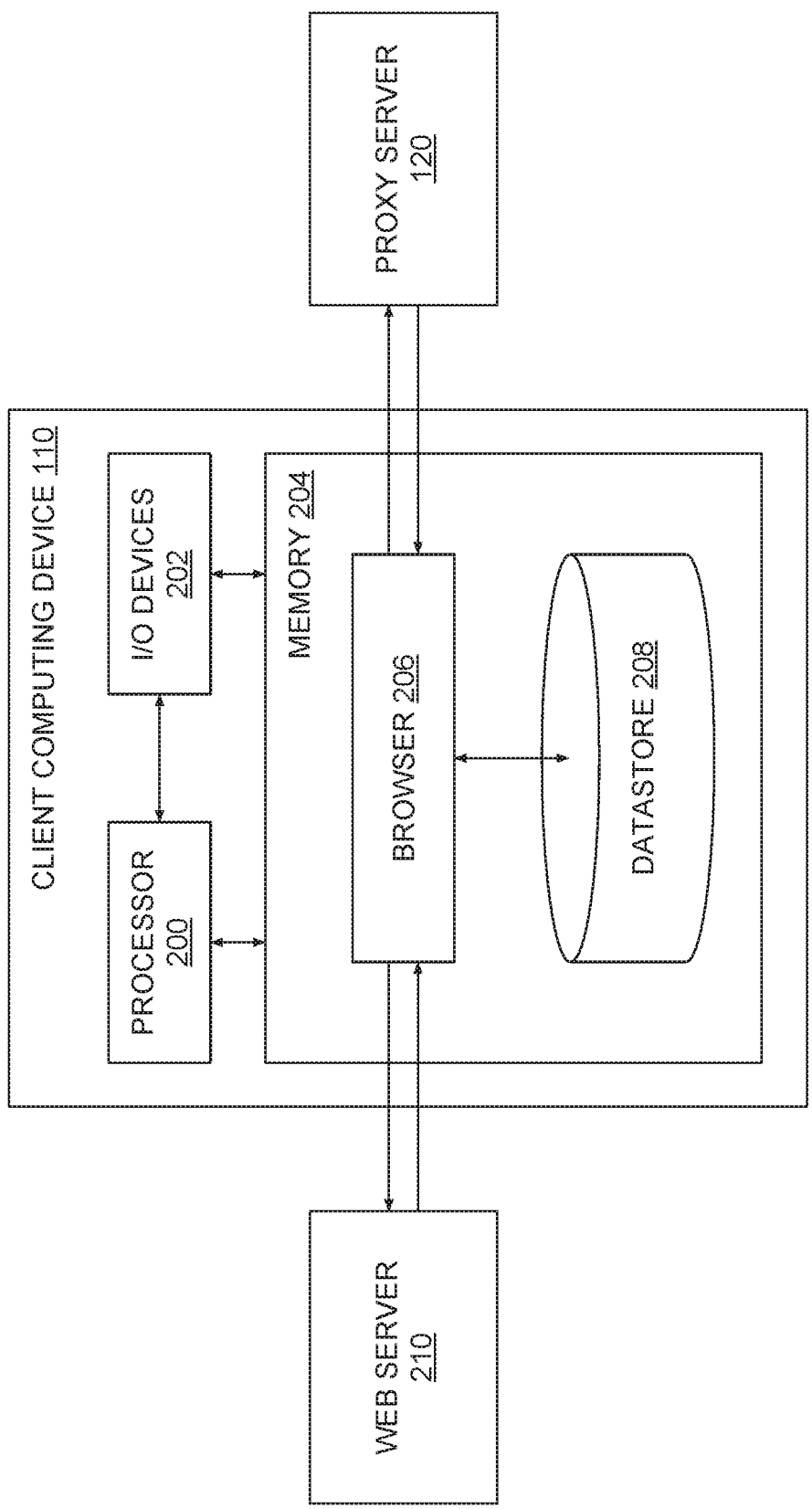
FIG. 2 is a more detailed illustration of the client computing device of FIG. 1, according to various embodiments.

FIG. 2 is a more detailed illustration of the client computing device of FIG. 1, according to various embodiments. As shown, client computing device 110 includes a processor 200, input/output (I/O) devices 202, and memory 204, coupled together. Processor 200 may be any technically feasible hardware unit configured to process data and execute program instructions. Processor 200 could be, for example, a central processing unit (CPU), a graphics processing unit (GPU), an application specific integrated circuit (ASIC), and any combination thereof. I/O devices 202 include devices for receiving input, devices for providing output, and devices for both receiving input and providing output. For example, I/O devices 202 could include a touchscreen configured to receive input and provide output. Memory 204 may include any technically feasible storage medium for storing data and software applications. Memory 204 could be, for example, a random access memory (RAM) module. Memory 204 includes a browser 206 and a datastore 208.

In operation, a user of client computing device 110 may interact with browser 206 (or other client-based software) to communicate with web server 210. Web server 210 may be, for example, a computing device coupled to the Internet and configured to provide access to various content and/or resources, including web pages, among other resources. Web server 210 may implement hyper-text transfer protocol (HTTP) to service HTTP requests submitted by the user via browser 206. In doing so, web server 210 may provide browser 206 with handle data corresponding to digital objects. Handle data could, for example, be associated with an image that is to be displayed on a web page served by web server 210. In response to receiving handle data, browser 206 interacts with proxy server 120 to obtain a cached version of the handle data for a digital object (and, potentially, any other associated metadata) or to cause proxy server 120 to obtain the handle data from handle system 130.

Figure 3:
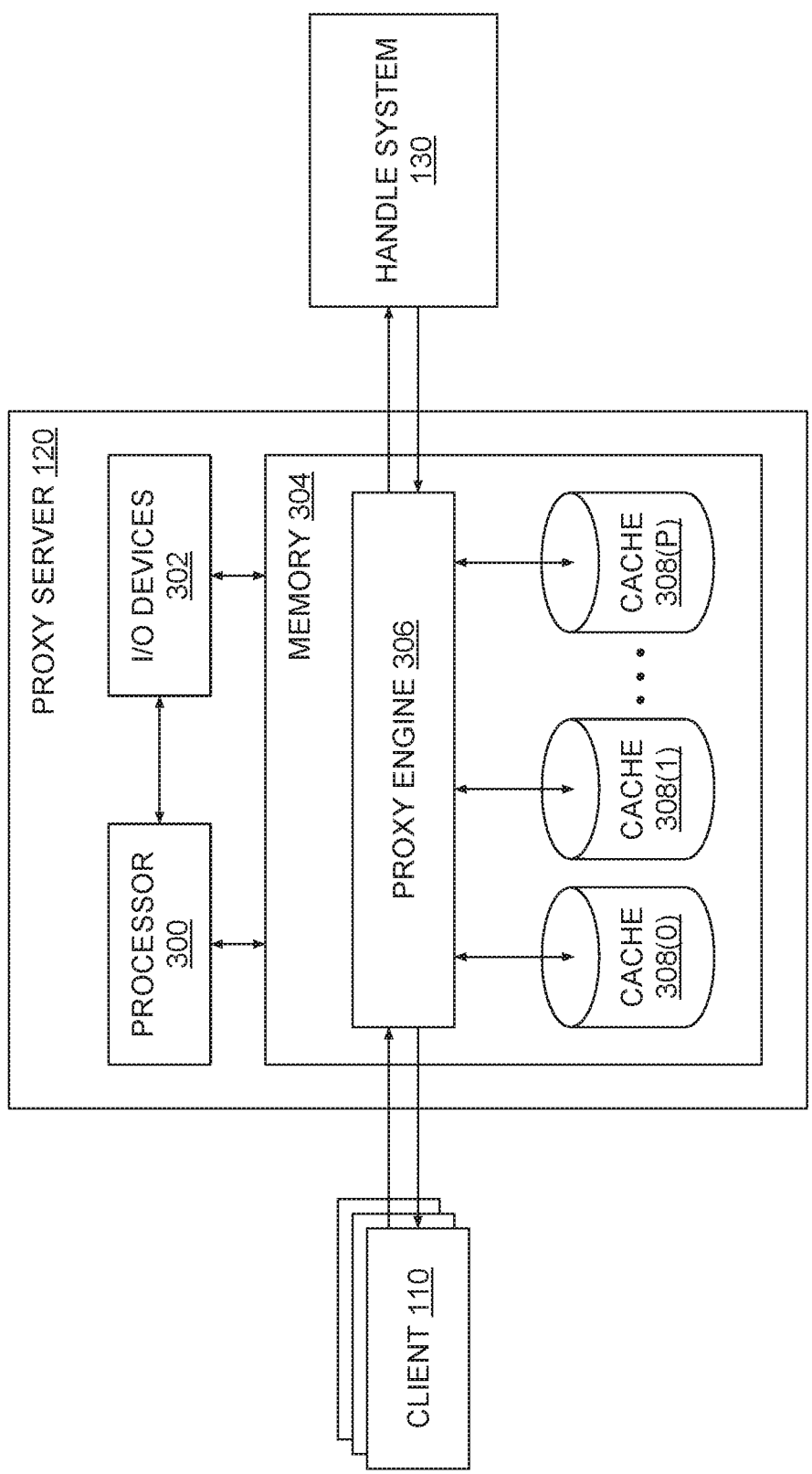
FIG. 3 is a more detailed illustration of the proxy server of FIG. 1, according to various embodiments.

FIG. 3 is a more detailed illustration of the proxy server of FIG. 1, according to various embodiments. As shown, proxy server 120 includes a processor 300, I/O devices 302, and memory 304, coupled together. Processor 300 may be any technically feasible hardware unit configured to process data and execute program instructions, including a CPU, a GPU, and ASIC, and so forth. I/O devices 302 include devices for receiving input, devices for providing output, and devices for both receiving input and providing output. Memory 304 may include any technically feasible storage medium for storing data and software applications. Memory 304 includes proxy engine 306 and a set of caches 308.

Proxy engine 306 may be, for example, a software application that, when executed by processor 300, services requests for handle data that are received from clients 110 by transmitting requested handle data to clients 110. To service a request for a given handle data, proxy engine 306 may retrieve the handle data from one of caches 308, if available. Proxy engine 306 may alternatively interact with handle system 130 to retrieve handle data, if not already cached or if client 110 is not authorized to see all of the data in the cached handle data. Proxy engine 306 may implement authentication and authorization procedures with clients 110 to verify the identities of clients 110 and to determine whether those clients are permitted to access specific digital objects and/or associated handle data. Proxy engine 306 may also facilitate clients 110 in performing authentication and/or authorization procedures with handle system 130. Proxy engine 306 may be configured to implement different caching models. Four exemplary models are described in greater detail below in conjunction with FIGS. 5A-5C and 9, 6A-6B and 10, 7A-7B and 11, and 8 and 12, respectively. In addition, these models may be implemented in conjunction with one another, as also described below.

FIG. 4 is a more detailed illustration of the handle system of FIG. 1, according to various embodiments. As shown, handle system 130 includes a global handle registry (GHR) 400 coupled to one or more local handle registries (LHRs) 402. Each LHR 402 may contain handle data referencing digital objects in repositories 132. As mentioned, repositories 132 may store digital objects. Each digital object may be associated with a handle ID and handle data identified by the handle ID, such as exemplary handle ID 420. The handle ID 420 may include, for example, a prefix 422 and a suffix such as identifier (ID) 424, which may be unique relative to the prefix. For a given digital object, the prefix 422 of the handle ID 420 may indicate the LHR 402 that manages the handle data of the digital object that is identified by the handle ID 420. The unique ID 424 corresponds to the handle data for the digital object and a reference found in the handle data can be used to retrieve that digital object from the relevant repository 132. In one embodiment, other data may be found in the handle data, as well.

In operation, GHR 400 and LHRs 402 may interoperate to service requests for handle data stored in LHRs 402. Each such request may include, for example, the handle ID 420 of the handle data to retrieve. To service a given request, GHR 400 identifies the prefix 422 of the handle ID 420 included in the request to a specific LHR 402. Then, that LHR 402 retrieves the relevant handle data based on the unique ID 424 of the handle. GHR 400 and LHRs 402 interoperate in a distributed and hierarchical manner, and are collectively referred to hereinafter as G/LHR 410. In one embodiment, G/LHR 410 may be implemented using one or more server machines configured to process data and execute program code. G/LHR 410 may interoperate with proxy server 120 to service requests in the manner described, and may also authenticate clients 110 and selectively authorize one or more clients 110 to access handle data having access restrictions. Additionally, G/LHR 410 may perform encryption procedures to encrypt handle data or data elements within handle data prior to transmission.

Referring generally to FIGS. 1-4, implementing proxy server 120 in conjunction with handle system 130 may allow for frequently accessed handle data (including corresponding metadata) to be cached within proxy server 120 to reduce latency incurred when accessing that handle data. Further, because proxy server 120 and handle system 130 support authentication and authorization procedures of G/LHR 410, handle data with access restrictions can be cached in a secure manner.

Proxy Server Caching Models

Figure 5A:
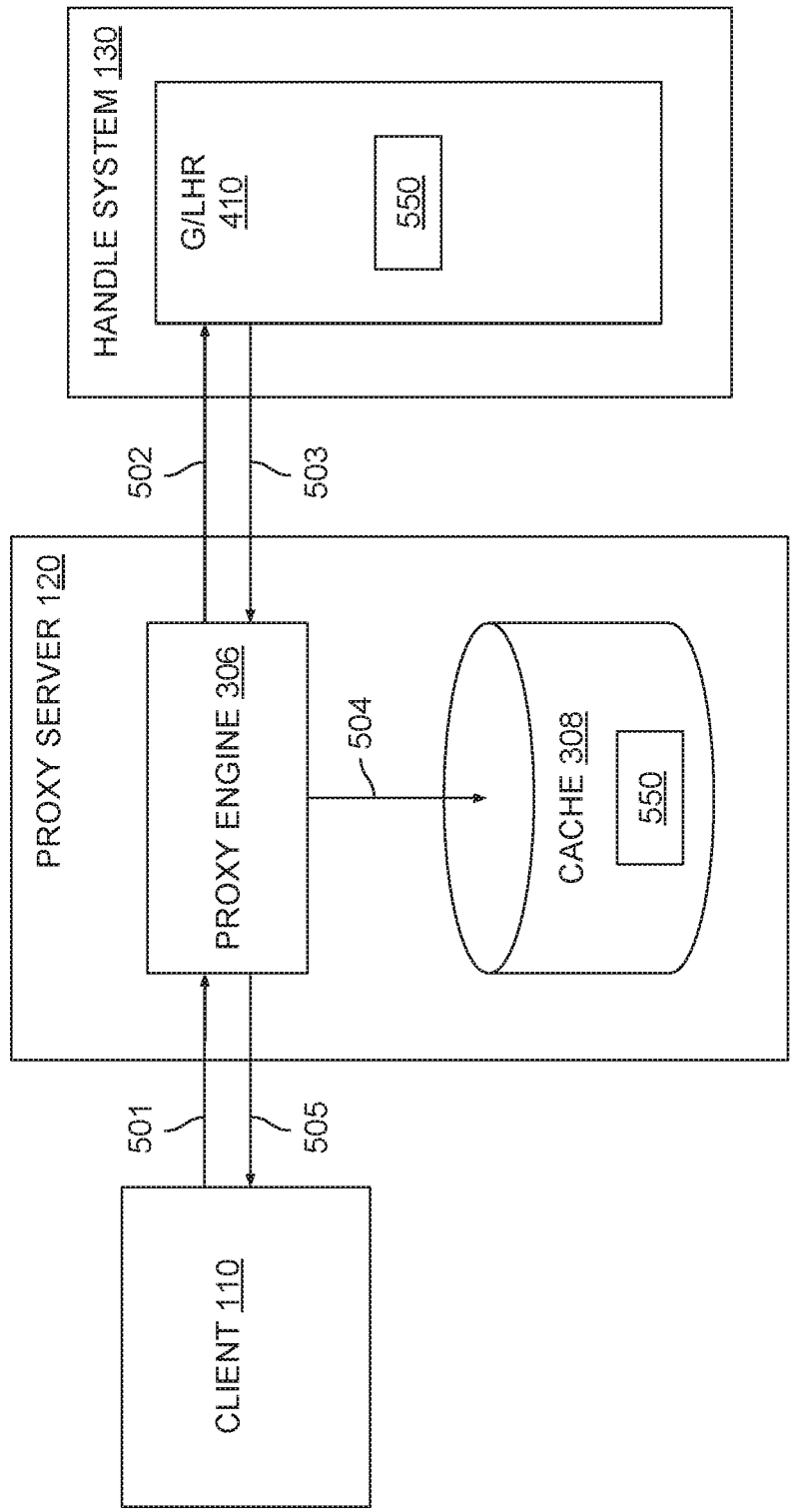
FIGS. 5A-5C illustrate how the proxy server of FIGS. 1-4 selectively caches handle data that does not have access restrictions, according to various embodiments.
Figure 5B:
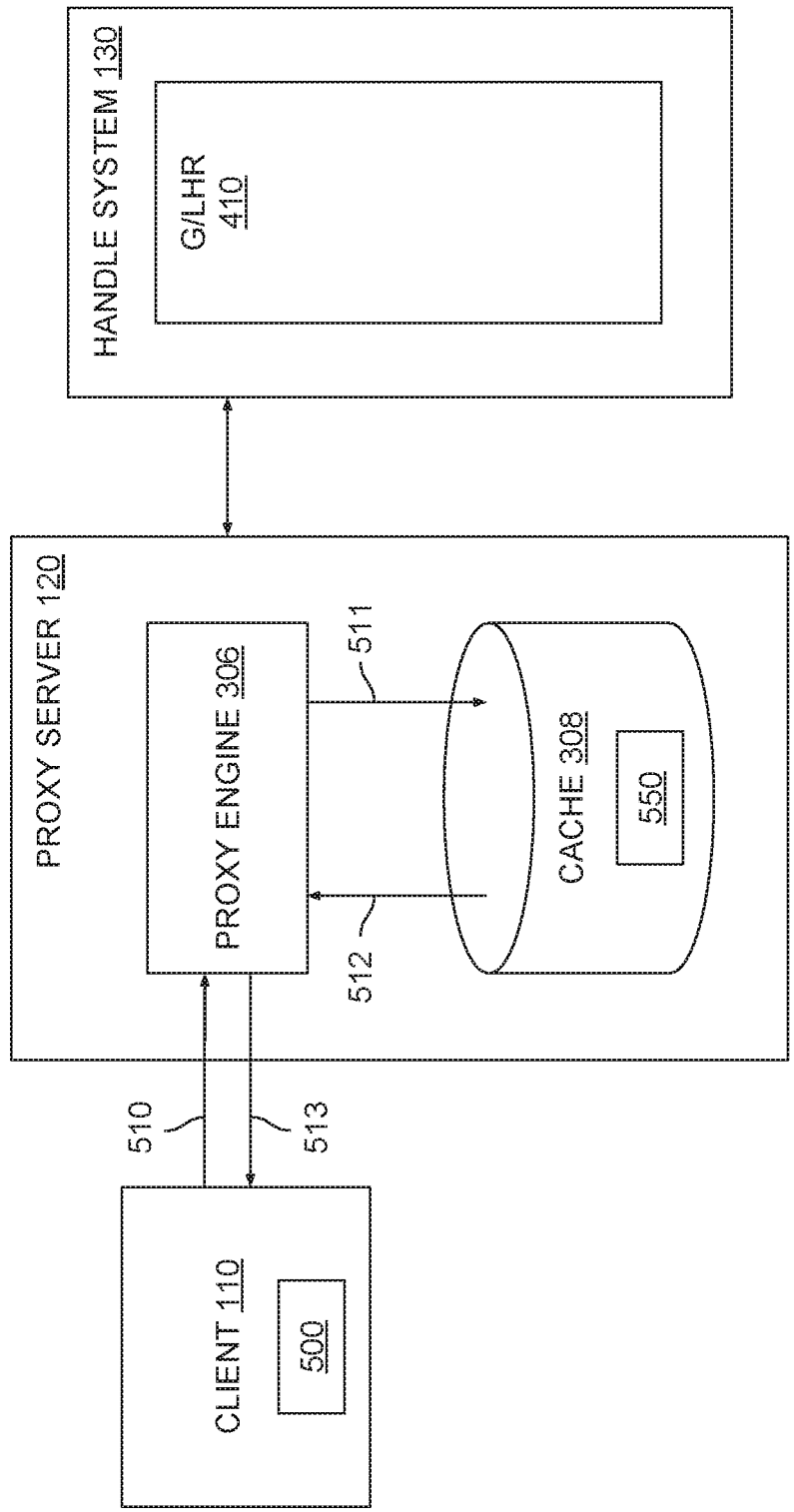
Figure 5C:
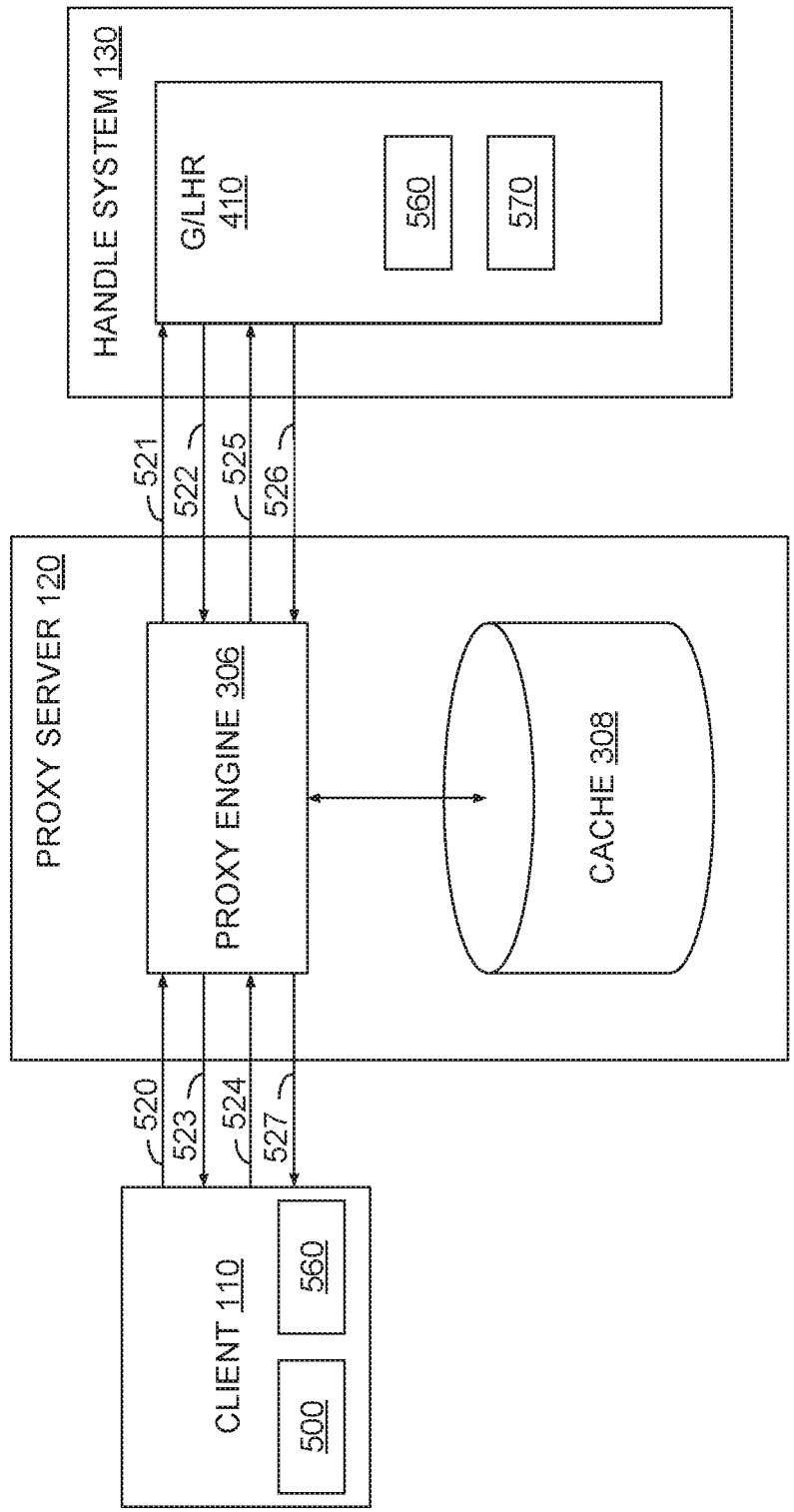

FIGS. 5A-5C illustrate how the proxy server of FIGS. 1-4 may selectively cache handle data that do not have access restrictions, according to various embodiments. Each of these figures sets forth a different sequence of transactions between any of client 110, proxy server 120, and handle system 130 that may occur in response to a request for handle data.

Referring now to FIG. 5A, transactions 501 through 505 occur when client 110 requests handle data from proxy server 120 that is currently not cached. As shown, client 110 initially submits a request for handle data to proxy engine 306 within proxy server 120 (transaction 501). The request may include a handle ID corresponding to the handle data. Then, proxy engine 306 may determine that the requested handle data is not cached, and forwards the request to G/LHR 410 within handle system 130 (transaction 502). Based on the handle ID included in the request, G/LHR 410 may access handle data 550 and return handle data 550 to proxy engine 306 (transaction 503). Proxy engine 306 may receive handle data 550 and then cache that handle data within cache 308 for subsequent rapid access (transaction 504). In particular, proxy engine 306 may directly access handle data 550 stored in cache 308 rather than needing to interact with G/LHR 410 to access handle data 550. This direct access could, for example, result in lower latency data access, higher efficiency data access, and/or higher performance data access. Proxy engine 306 may also return handle data 550 to client 110, thereby servicing the initial request (transaction 505). Cached handle data 550 may then be returned with low latency in response to future requests for that handle data, as described in greater detail below.

Referring now to FIG. 5B, transactions 510 through 513 occur when client 110 requests handle data from proxy server 120 that is currently cached. As shown, client 110 submits a request for the handle data to proxy engine 306 within proxy server 120 (transaction 510). Client 110 may include a public key 500 with this request for authentication purposes. A more detailed example of this type of transaction is described in greater detail below in conjunction with FIG. 5C. Proxy engine 306 may inspect cache 308 and determine that the requested handle data is cached (transaction 511). Proxy engine 306 may then retrieve handle data 550 from cache 308 (transaction 512). Finally, proxy engine 306 may return handle data 550 to client 110 (transaction 513), thereby servicing the request in an expedited manner. Proxy engine 306 may also service requests for handle data that have access restrictions based on public key 500, as described below.

Referring now to FIG. 5C, transactions 520-527 occur when client 110 requests handle data that has access restrictions from proxy server 120. In this case, the client 110 may be authorized by G/LHR 410 to access the handle data. Authorization may be accomplished by providing to G/LHR 410 an access token issued to client by an authentication and authorization service that is trusted by G/LHR 410. To facilitate provision of the access token to G/LHR 410, client 110 must first be authenticated and authorized by the authentication and authorization service that issues access tokens. Once client 110 is authenticated, authorization service issues an access token that can be used by G/LHR 410 to determine if a client is authorized to view handle data having access restrictions.

As shown, client 110 may initially submit authentication credentials to proxy engine 306 for authentication purposes (transaction 520). In performing this transaction, client 110 may also submit public key 500 to proxy engine 306. Proxy engine 306 forwards the authentication credentials and public key 500 to G/LHR 410 (transaction 521). G/LHR 410 may authenticate the identity of client 110 and then generate an access token 560 for client 110 to use when requesting secure digital objects, such as secure digital object 570. G/LHR 410 may encrypt access token 560 using public key 500 and then return token 560 to proxy engine 306 (transaction 522). Proxy engine 306 may provide token 560 to client 110 (transaction 523), whereby client 110 decrypts that token using public/private key techniques. In this manner, proxy engine 306 may facilitate authentication of client 110.

Subsequently, client 110 may submit a request for handle data 570 and include client public key 500 and access token 560 in that request (transaction 524). In some examples, public key 500 of client 110 may have been embedded into access token 560 during authentication and authorization processing that was used to obtain the access token for client 110. Proxy engine 306 may determine that the request includes access token 560, indicating that the access token may be used for determining access to requested handle data that has access restrictions and is therefore not cached. Proxy engine 306 may forward the request to G/LHR 420 (transaction 525). G/LHR 410 processes the request and determines, based on access token 560, that client 110 is authorized to access handle data 570. G/LHR 410 may retrieve handle data 570 and encrypt that handle data using public key 500, and return the encrypted handle data to proxy engine 306 (transaction 526). Proxy engine 306 may receive the encrypted handle data and then forward that handle data to client 110 without interacting with cache 308 (transaction 527), thereby servicing the initial request for handle data 570. Client 110 may then decrypt the encrypted handle data using the private key corresponding to the public key of client 110 using public/private key techniques.

Referring generally to FIGS. 5A-5C, the caching model described in conjunction with these figures may expedite access to handle data and associated metadata that do not have access restrictions.

Figure 6A:
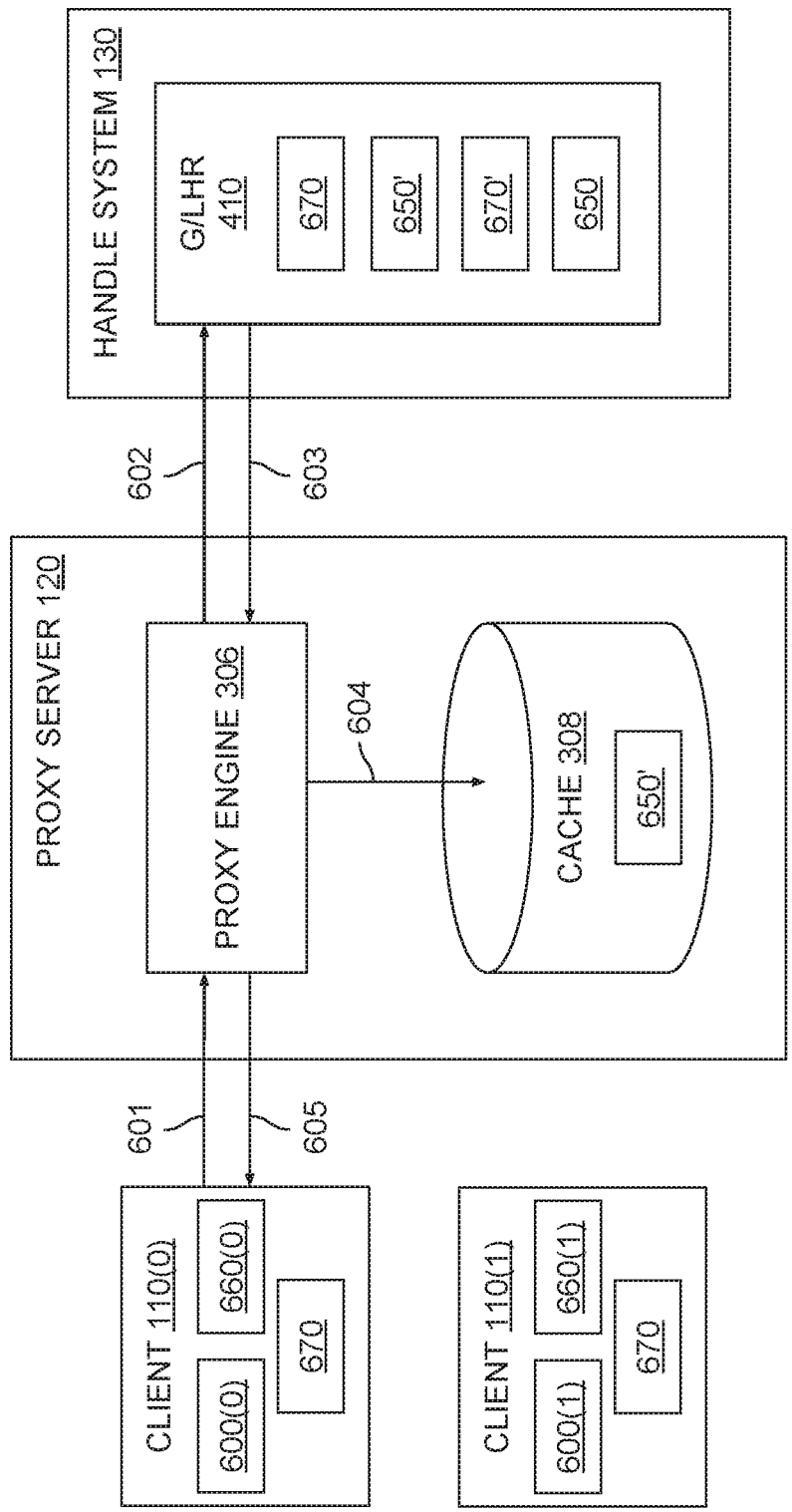
FIGS. 6A-6B illustrate how the proxy server of FIGS. 1-4 caches handle data that is encrypted with a symmetric key, according to various embodiments.
Figure 6B:
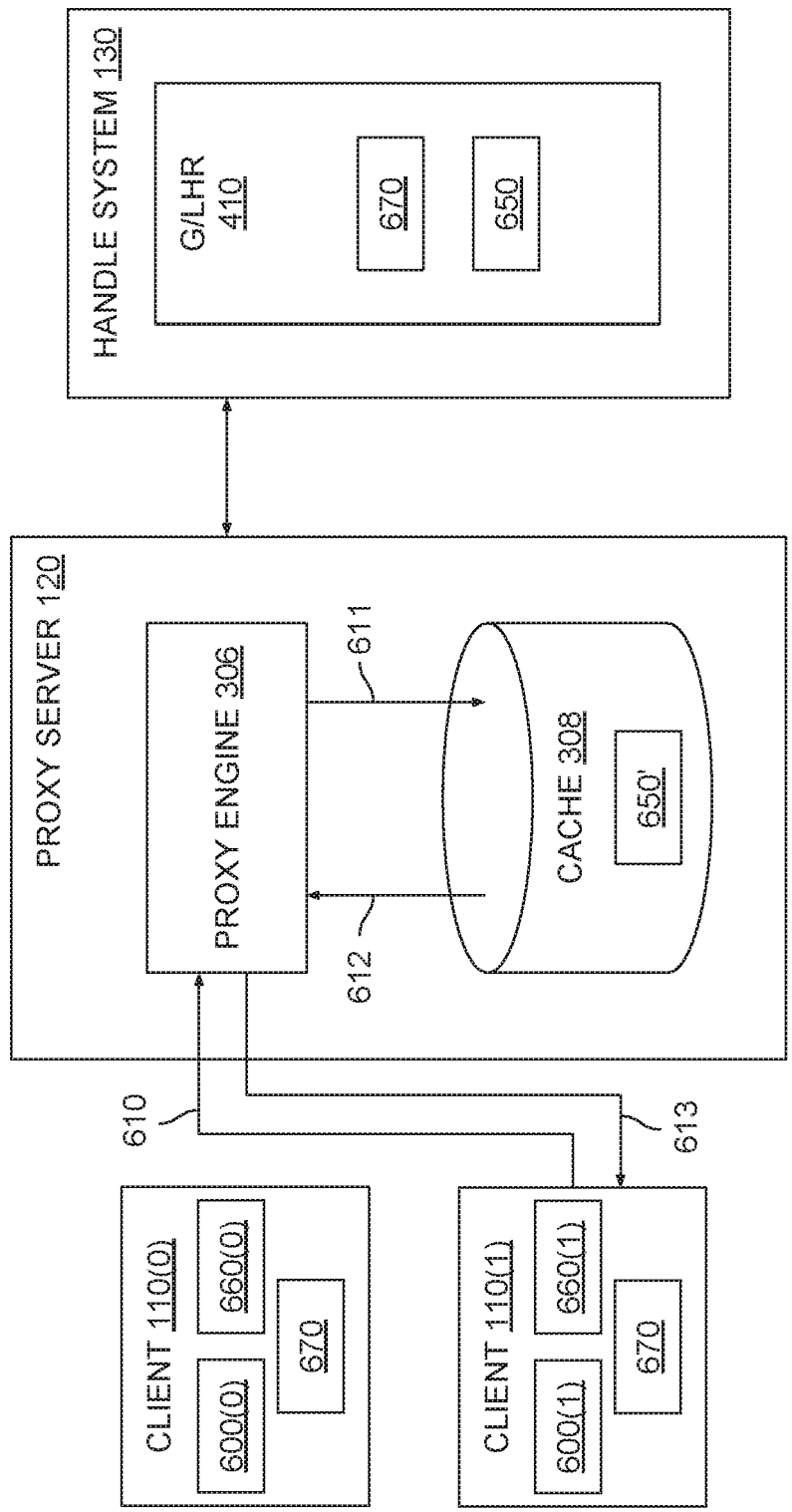

FIGS. 6A-6B illustrate how the proxy server of FIGS. 1-4 may cache handle data that is encrypted with a symmetric key, according to various embodiments. Each of these figures sets forth a different sequence of transactions between one or more clients 110, proxy server 120, and handle system 130 that may occur in response to a request for handle data and/or associated metadata.

Referring now to FIG. 6A, transactions 601 through 605 may occur when client 110(0) has already performed an authentication and authorization procedure to be granted an access token and then requests access to handle data 650 that has access restrictions. Initially, client 110(0) may submit a request to proxy engine 306 and includes in that request access token 660(0) and public key 600(0) (transaction 601). Proxy engine 306 receives the request and may determine that the requested handle data is not cached. Proxy engine 306 may then forwards the request to G/LHR 410 (transaction 602). G/LHR 410 may perform an authorization procedure and determine that client 100(0) is authorized to access handle data 650. When authorizing client 110(0), G/LHR 410 may determine that client 110(0) belongs to a group that is granted access to handle data 650 based on an access policy associated with that handle data. According to an embodiment, the group and access policy may be associated with a symmetric key 670 that is used to encrypt all handle data or restricted data within the handle data for which the group has access according to the access policy. Symmetric key 670 may be bound to an access policy that allows any member of the group to access all handle data subject to the access policy. Consequently, distribution of symmetric key 670 can be restricted to group members to allow group members to decrypt handle data or restricted handle data encrypted with symmetric key 670, and symmetric key 670 is not distributed to non-group members. Controlled distribution of the symmetric key 670 may assure that only group members authorized to access handle data or restricted data included therein can decrypt the encrypted handle data or encrypted data included therein.

In some embodiments, the method by which encrypted handle data is retrieved from G/LHR 410, cached by proxy engine 306, and processed by client 110 works as follows. G/LHR 410 may retrieve symmetric key 670 and then encrypt handle data 650 using that key to generate encrypted handle data 650'. G/LHR 410 may encrypt symmetric key 670 using client's public key 600(0) to generate encrypted symmetric key 670'. G/LHR 410 may then return encrypted handle data 650' and encrypted symmetric key 670' to proxy engine 306 (transaction 603) along with a symmetric key identifier that G/LHR 410 associates with symmetric key 670'. Proxy engine 306 may cache encrypted handle data 650' (transaction 604) and the associated symmetric key identifier in cache 308. Proxy engine 306 may also return encrypted handle 650', along with encrypted symmetric key 670' and the symmetric key identifier, to client 110(0) (transaction 605). Client 110(0) may then decrypt encrypted symmetric key 670' using public/private key techniques using the private key of client 110 associated with the public key of client 110 that was used to encrypt encrypted symmetric key 670', and then use symmetric key 670 to decrypt encrypted handle data 650'. Client 110 may then cache encrypted symmetric key 670' or symmetric key 670 and the associated symmetric key identifier for later use in identifying locally cached symmetric keys and use of those cached symmetric keys to decrypt handle data or decrypt restricted handle data encrypted with the cached symmetric keys. In this manner, the initial request for digital object 650 is serviced. Once encrypted handle data 650' is cached by proxy engine 306, however, subsequent requests for that handle data can be serviced both securely and expeditiously, as described below.

Referring now to FIG. 6B, transactions 610 through 613 occur when client 110(1) submits a request to proxy engine 306 for handle data 650. In this scenario, client 110(1) may have already performed authentication and authorization processes and received a symmetric key 670 and symmetric key identifier applicable to requested handle data. Client 110(1) may submit the request for handle data 650 (transaction 610). Proxy engine 306 may determine that the requested handle data is cached in encrypted form (transaction 611).

Proxy engine 306 may retrieve encrypted handle data 650' (transaction 612). Proxy engine 306 may then return encrypted handle data 650' and a symmetric key identifier for symmetric key 670 used to encrypt the handle data to client 110(1), thereby servicing the request (transaction 613). Client 110(1) uses the symmetric key identifier to retrieve symmetric key 670 from a local cache of client 110 and may then use symmetric key 670 to decrypt encrypted handle data 650'.

In some cases, client 110 will find that the symmetric key identified by a symmetric key identifier is not locally cached. In this case client 110 may resubmit a request to proxy server 120 and include an access token of client 110 and a public key in the request and receive back encrypted handle data, an encrypted symmetric key and a symmetric key identifier as described herein. Such requests may include an indicator that client 110 does not have the symmetric key used to encrypt the handle data in a local cache, this indicating to proxy engine 306 that authorization to retrieve handle data by G/LHR 410 is needed. In some embodiments, client 110 may always provide the access token and public key in requests to proxy server 120. In some embodiments, proxy server 120 may track symmetric keys given to clients and may transparently to the client perform authorization processing relative to a client to enable a client to receive a symmetric key that proxy server 120 does not know is in possession by the client.

According to an embodiment, client 110 may provide the access token and public key to proxy server 120 to support authorization relative to desired handle data by G/LHR 410 and subsequent relay of encrypted symmetric key 670' back to client 110. In some embodiments, proxy server 120 tracks symmetric keys given to clients. When client 110 does not provide an access token and public key with a request and proxy server 120 does know if client 110 has the symmetric key needed for cached handle data, proxy server 120 may return to client 110 an indicator that client 110 should resubmit the request with an access token and public key. The access token and public key allow for client 110 to be authorized relative to the desired handle data and receive encrypted symmetric key 670'. In some embodiments, proxy server 120 may provide an unencrypted subset of handle data that is not subject to access policies (public data) to client 110 either as a default or based on an indicator in a client request that only public data should be retrieved. In some cases where proxy may respond to requests by returning only handle data that is not subject to access policies (public data), requests of client 110 for handle data subject to access policies would include an indicator that client 110 is requesting this data, in which case the caching models described herein for authorization, encryption, decryption, and caching would apply.

According to an embodiment, the proxy caching of client tokens and public keys allows for the client to be authenticated. For example, proxy server 120 may, transparent to a client, perform authorization relative to a client to enable the client to receive a symmetric key. In operation, the proxy server 120 may cache the client token and public key. Upon receiving a request from the client that does not include an access token and/or a public key, the proxy server 120 may transmit the cached client token and public key to the G/LHR 410. The proxy server 120 may transmit the encrypted public key and the encrypted handle received from the G/LHR 410 back to the client. In various embodiments, the proxy server 120 may detect and remove stale client tokens and/or public keys stored in the cache. For example, the cache storing the tokens and keys may implement a maximum time to live (TTL) after which a token or key is deemed expired. As another example, the proxy server 120 may detect changes in the public key based on the client providing a new public key when setting up a network connection to the proxy server 120.

Referring generally to FIGS. 6A-6B, persons skilled in the art will understand how various techniques can be implemented to reduce or eliminate security risks when authorization states change. For example, in the above scenario, access could be revoked to client 110(1) to handle data 650 at any time. To prevent subsequent unauthorized access to handle data 650, proxy engine 306 may expire symmetric key 670 and/or expire any cached handle data associated with that symmetric key. Proxy engine 306 and/or G/LHR 410 may also implement time-to-live (TTL) techniques to indicate how long digital objects can remain cached. For example, proxy engine 306 and/or G/LHR 410 may include a timestamp within a cached version of a given digital object indicating when the cached version of the given digital object should be removed from the cache.

G/LHR 410 and proxy engine 306 may use the same symmetric key identifier across numerous handle data to which a particular group of clients 110 is provided access. According to an embodiment, proxy engine 306 may remove cached handle data that is not associated with a valid symmetric key identifier. In so doing, proxy engine 306 may obtain a list of valid symmetric key identifiers from G/LHR 410. Proxy engine 306 may also pre-emptively cache handle data based on lookup patterns. Additionally, G/LHR 410 may partially encrypt only metadata portions of handle data that are subject to access policies. Proxy engine 306 may also cache only public elements of handle data and not cache other elements considered private. The caching model discussed above in conjunction with FIGS. 6A-6B may also be combined with the techniques discussed previously in conjunction with FIGS. 5A-5C. For example, proxy engine 306 may cache handle data having no access restrictions in a first cache and then cache handle data encrypted with symmetric keys in a second cache. Although the foregoing description involves symmetric keys, these techniques may be modified to instead or additionally use asymmetric keys.

Figure 7A:
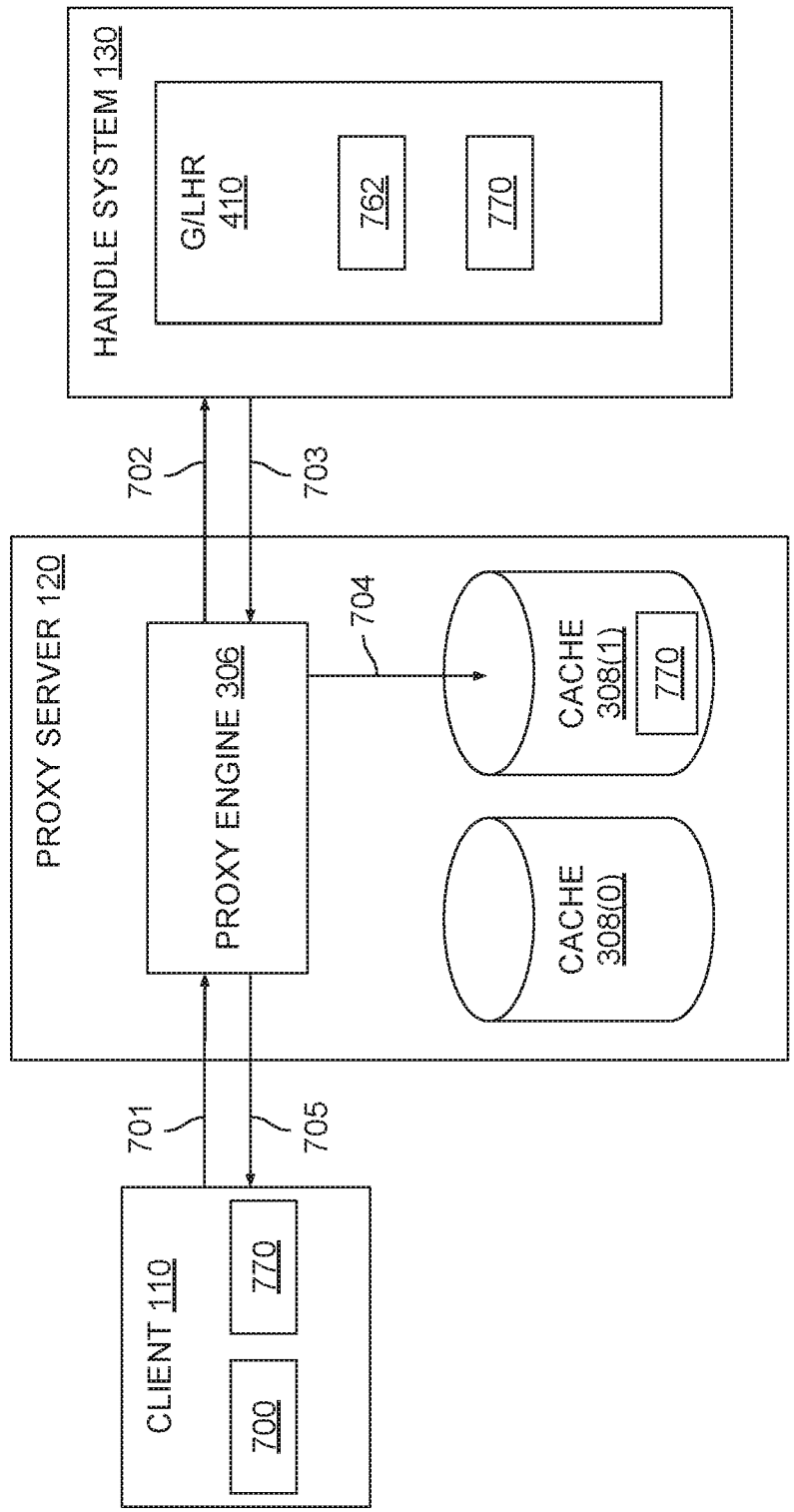
FIGS. 7A-7B illustrate how the proxy server of FIGS. 1-4 re-encrypts cached handle data for delivery to a client machine, according to various embodiments.
Figure 7B:
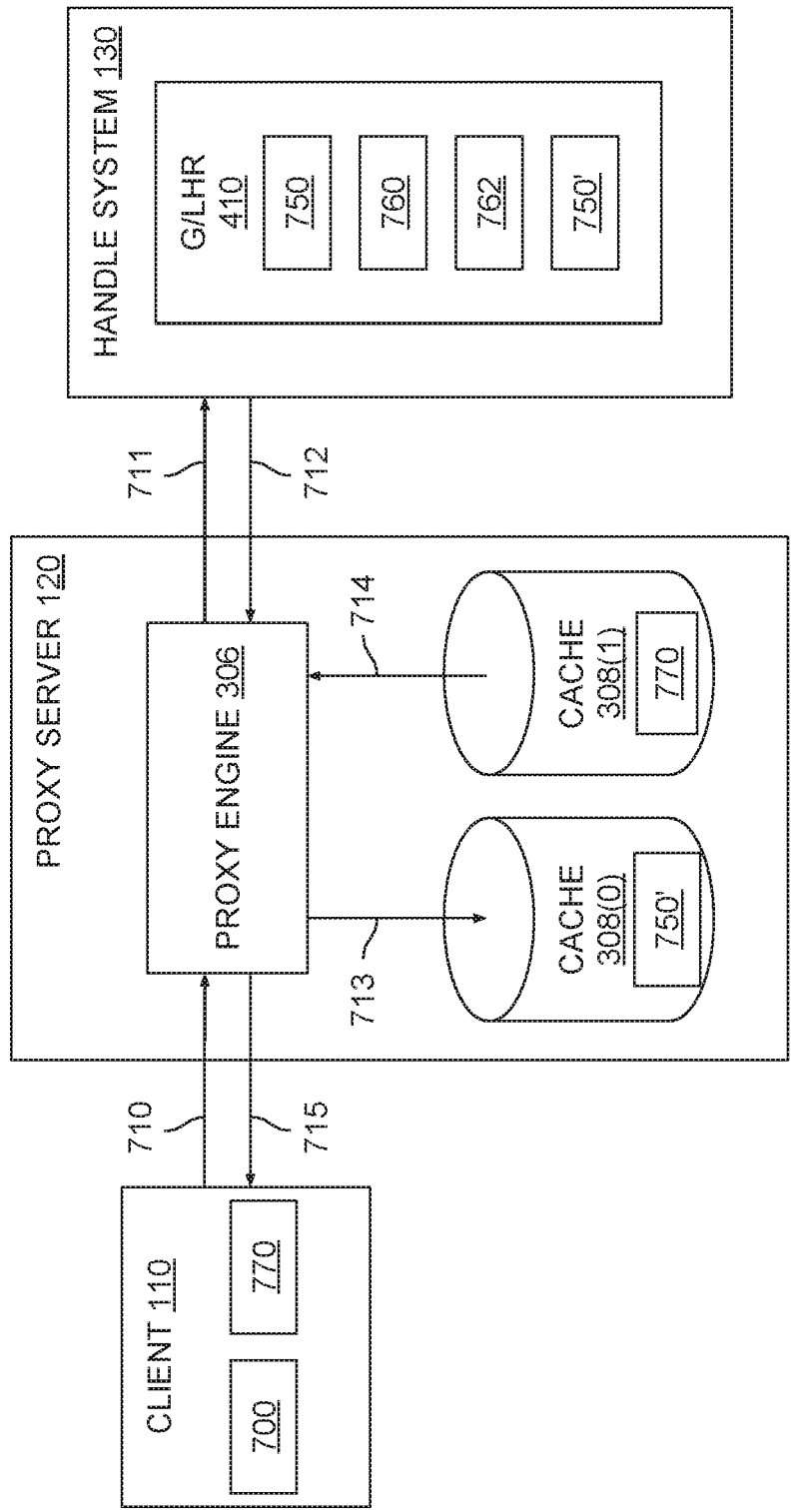

FIGS. 7A-7B illustrate how the proxy server of FIGS. 1-4 re-encrypts cached handle data for delivery to a client machine, according to various embodiments. Each of these figures sets forth a different sequence of transactions between a client 110, proxy server 120, and handle system 130 that may occur in response to a request for handle data and/or associated metadata.

Referring now to FIG. 7A, transactions 701 through 705 occur when client 110 performs an authentication procedure to obtain a re-encryption key. Prior to requesting access to any handle data with access restrictions, client 110 may first provide public key 700 to proxy engine 306 (transaction 701). Proxy engine 306 then transmits public key 700 to G/LHR 410 (transaction 702) as part of a client authentication process. G/LHR 410 may use client public key 700 along with a private key 762 associated with G/LHR 410 (or a specific LHR 402 included therein) to generate re-encryption key 770, and then transmits this re-encryption key to proxy engine 306 (transaction 703). G/LHR 410 may encrypt re-encryption key 770 for transit. Proxy engine 306 may cache re-encryption key 770 within cache 308(1) (transaction 704) and/or relays re-encryption key 770 back to client 110 (transaction 705). Proxy engine 306 may then re-encrypt requested handle data using the client-specific re-encryption key 770, as described below.

Referring now to FIG. 7B, client 110 may submit a request for handle data 750 that has access restrictions (transaction 710). Client 110 authentication and authorization relative to the requested handle data may be performed in conjunction with FIG. 7B, for example. Proxy server 120 may also replicate the access policies and authorization techniques of G/LHR 410 so as to eliminate the need to interact with G/LHR 410 for determining if client 110 is authorized to access cached handle data. According to an embodiment, proxy engine 306 may determine that handle data 750 (or an encrypted version thereof) is not stored in cache 308(0), and forward the request to G/LHR 410 (transaction 711). G/LHR 410 may retrieve handle data 750 and then generate encrypted handle data 750' using public key 760. G/LHR 410 may return encrypted handle data 750' to proxy engine 306 (transaction 712). Proxy engine 306 may cache encrypted handle data 750' in cache 308(0) (transaction 713). Proxy engine 306 may then retrieve re-encryption key 770 from cache 308(1) for client 110 and re-encrypt encrypted handle data 750' (transaction 714). This re-encryption step allows proxy engine 306 to encrypt, on a per client basis, handle data that has already been encrypted for general security purposes. Proxy engine 306 may then return the re-encrypted handle data to client 110 (transaction 715). Client 110 can decrypt the re-encrypted handle data using the private key of client 110 associated with public key used in creating re-encryption key 770 using public/private key techniques.

According to an embodiment, proxy server 120 can cache encrypted versions of handle data and then re-encrypt that handle data using per-client re-encryption keys. Accordingly, proxy engine 306 may revoke access to secure handle data from one or more specific clients 110 by purging the re-encryption keys associated with those clients from cache 308(1). In doing so, proxy engine 306 need not purge cached handle data from cache 308(0), and may continue to provide rapid access to that handle data for authorized clients. According to an embodiment, proxy server 120 may interact with client 110 in order to gain authorization for generating re-encryption key 770.

Figure 8:
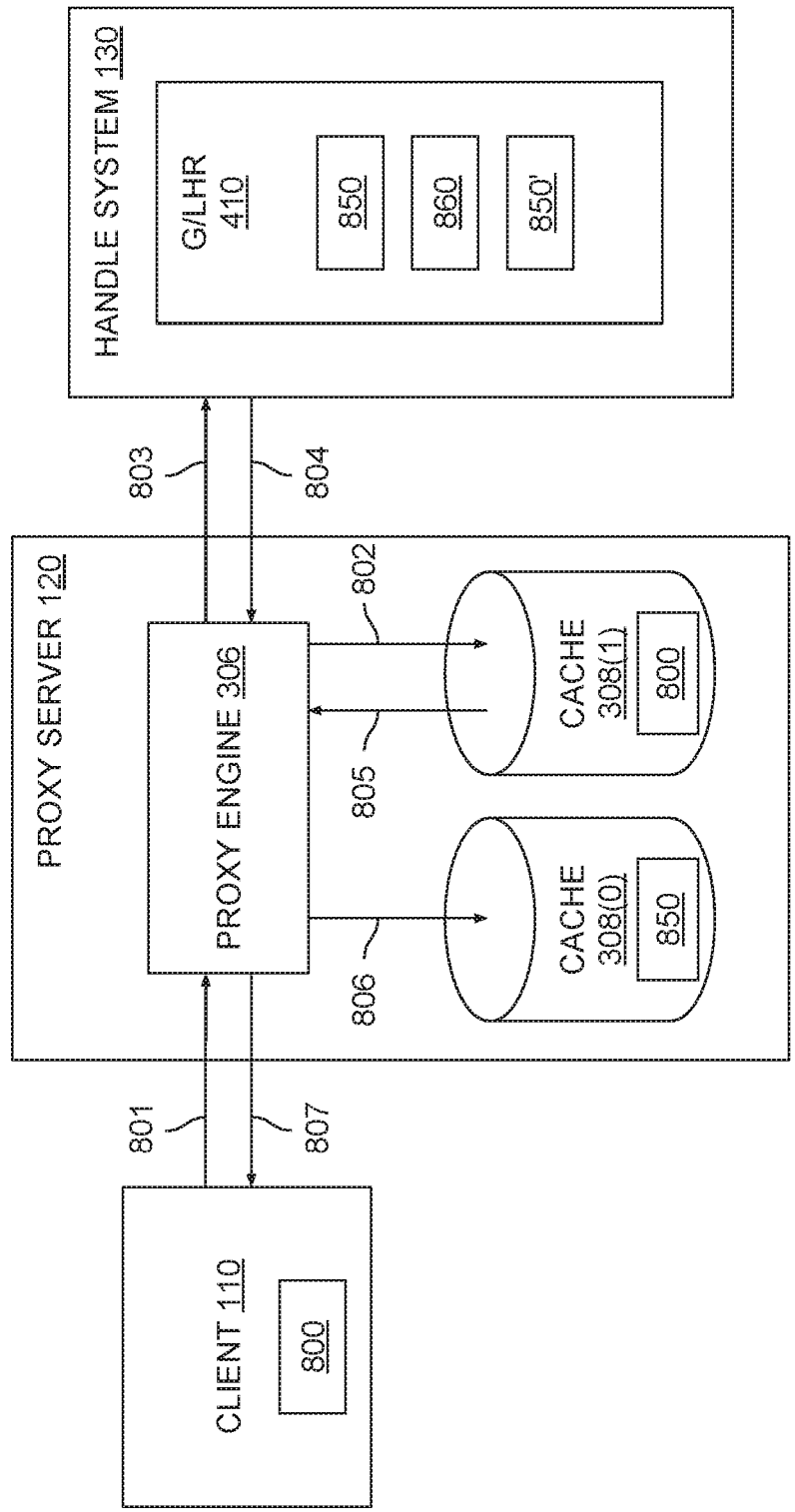
FIG. 8 illustrates how the proxy server of FIGS. 1-4 decrypts encrypted handle data on behalf of a client machine, according to various embodiments.

FIG. 8 illustrates how the proxy server of FIGS. 1-4 decrypts encrypted handle data on behalf of a client machine, according to various embodiments. For example, this technique may be applied when proxy server 120 is trusted to process unencrypted handle data subject to access restrictions on behalf to G/LHR 410. Each of these figures sets forth a different sequence of transactions between a client 110, proxy server 120, and handle system 130 that may occur in response to a request for handle data and/or associated metadata.

Initially, client 110 may transmit a decryption key 800 and a request for handle data to proxy engine 306 (transaction 801). Proxy engine 306 may cache the decryption key in a cache 308(1) (transaction 802). Proxy engine 306 may then check to see if the handle data is cached and if so, it may check to see if client 110 is authorized to retrieve the handle data. Proxy engine 306 may act on behalf of G/LHR 410 to verify client 110 identity and authorizations and may use any of the techniques, described above used by G/LHR to perform this function. Proxy engine 306 may also have a copy of G/LHR access policies. An access policy could include, for example, an access control list (ACL). If proxy engine 306 has the desired handle data cached and client 110 is authorized to retrieve the handle data, proxy engine 306 may return the desired handle data to client 110. If proxy engine 306 has the desired handle cached and client 110 is not authorized to retrieve the handle data, proxy engine 306 may return a status code consistent with what G/LHR returns to clients that attempt to retrieve handle data they are not authorized to access.

If handle data is not cached, proxy engine 306 may forward the request to G/LHR 410 (transaction 803). G/LHR 410 may retrieve the requested handle data 850 and then return it to proxy engine 306. G/LHR 410 may also return the access policy associated with handle data 850. In doing so, G/LHR 410 may encrypt that handle data using an encryption key 860 corresponding to decryption key 800 and transmit encrypted digital object 850' to proxy engine 306 (transaction 804). Proxy engine 306 may retrieve decryption key 800 from cache 308(1) (transaction 805). Proxy engine 306 may then use decryption key 800 to decrypt encrypted handle data 850', and then caches handle data 850 in unencrypted form (transaction 806). Proxy engine 306 may then check to see if client 110 is authorized to retrieve the handle data. If client is authorized to retrieve the handle data, proxy engine 306 may then return the handle data 850 back to client 110, thereby servicing the initial request (transaction 807). As mentioned, the caching model described herein may be suitable, for example, when proxy server 120 is trusted by G/LHR 410 with the handling of unencrypted data that is subject to access restrictions.

Referring generally to the various caching models discussed in conjunction with FIGS. 5A-8, different models can be implemented by proxy engine 306 in conjunction with one another. For example, proxy engine 306 could manage a plurality of different caches 308 configured to separately store unencrypted handle data, handle data encrypted with symmetric keys, and encrypted handle data suitable for re-encryption. Other caches 308 could cache symmetric keys, re-encryption keys, and decryption keys, among others. FIGS. 9-12 illustrate methods which proxy engine 306 may perform to caching models discussed thus far.

Procedures for Implementing Caching Models

Figure 9:
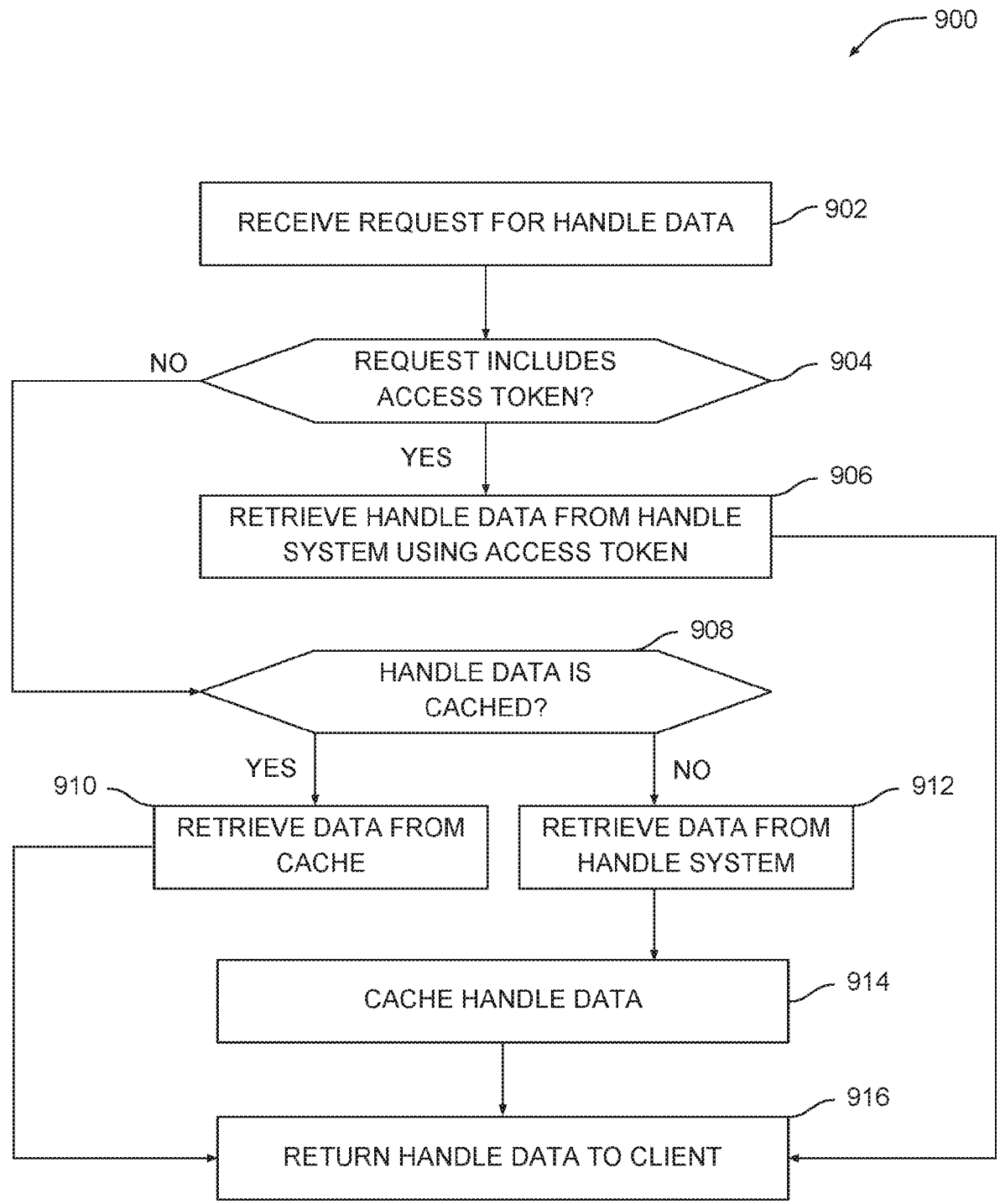
FIG. 9 is a flow diagram of method steps for selectively caching handle data, according to various embodiments.

FIG. 9 is a flow diagram of method steps for selectively caching handle data, according to various embodiments. Although the method steps are described in conjunction with the systems of FIGS. 1-8, persons skilled in the art will understand that the method steps can be performed in any order by any system.

As shown, a method 900 begins at step 902, where proxy engine 306 may receive a request for handle data from a client 110. At step 904, proxy engine 306 may determine whether the request includes an access token. Client 110 may supply an access token along with the request and include the public key of client 110 with the request.

Proxy engine 306 may then determine whether the requested handle data is cached. If the handle data is not cached it may be subject to access policies. Proxy engine 306 may then retrieve the handle data from handle system 130 using the client's access token for authorization. The public key of the client may be provided on the request to handle system 130. The public key and access token may have been provided to proxy engine 306 by the client as part of the client's request or may come from a cache maintained by proxy engine 306. Handle system 130 may then determine if client 110 is authorized to retrieve handle data based on any access policies applicable to the handle data and authorizations found in client's access token. If the client is authorized to retrieve the handle data, handle system 130 may provide the handle data to proxy engine 306. If the handle data is subject to access policies, handle system 130 may encrypt the handle data using the public key of client 110. If the handle data is not subject to access policies, handle system 130 may return the handle data in unencrypted form. If proxy engine 306 was able to retrieve handle data matching client's request, proxy engine 306 may return the handle data to the client. If handle data was encrypted client 110 may then decrypt the encrypted handle data using the private key corresponding to client's public key. If the handle data returned from handle system is unencrypted, proxy engine 306 will know that it is not subject to access policies and will cache it. Proxy engine 306 may return an indicator to the client to indicate the status of the request including an indicator that the returned handle data was encrypted with client's public key, or that the returned handle data is unencrypted, or that the client is not authorized to retrieve the handle data.

If at step 904 proxy engine 306 determines that the request includes an access token with an embedded public key, then the method may proceed to step 906, where proxy engine 306 retrieves the object from handle system 130 using the access token. Handle system 130 may provide the object in encrypted form. At step 916, proxy engine 306 may return the encrypted object to client 110, and client 110 may then decrypt the encrypted object using the private key corresponding to the provided public key.

Returning to step 904, if proxy engine 306 determines that the request does not include an access token, then the method 900 may proceed to step 908, where proxy engine 306 determines whether the requested object is cached. If proxy engine 306 determines that the object is cached, then at step 910 proxy engine 306 may retrieve the object from the cache and returns the object to client 110 at step 916. However, if proxy engine 306 determines that the object is not cached, then at step 912 proxy engine 306 may retrieve the object from handle system 130. At step 914, proxy engine 306 may cache the object for future expedient access. Then, at step 916 proxy engine 306 may return the object to client 110. The method 900 described herein generally corresponds to the caching model discussed in conjunction with FIGS. 5A-5C.

Figure 10:
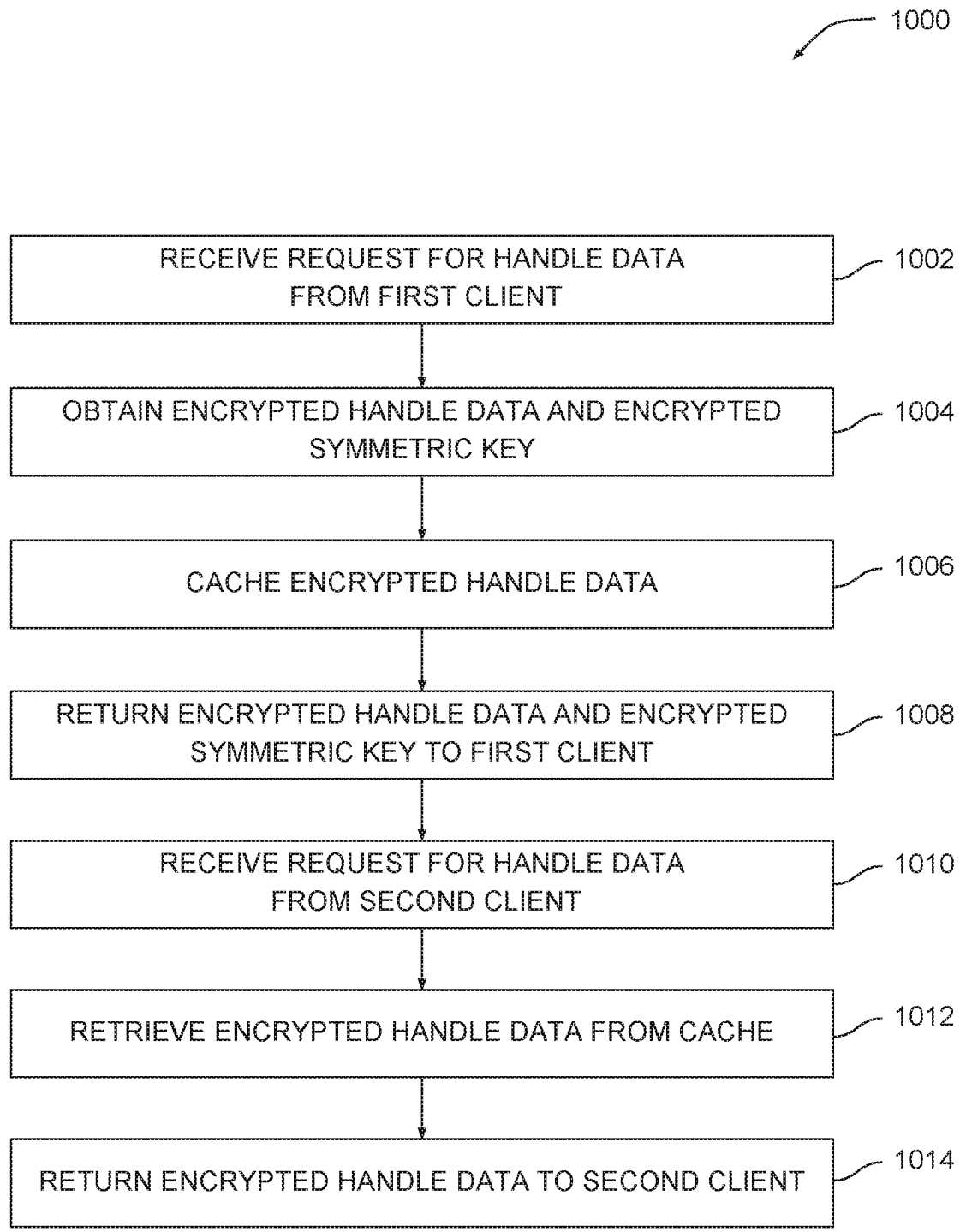
FIG. 10 is a flow diagram of method steps for caching encrypted handle data, according to various embodiments.

FIG. 10 is a flow diagram of method steps for caching encrypted handle data, according to various embodiments. Although the method steps are described in conjunction with the systems of FIGS. 1-8, persons skilled in the art will understand that the method steps can be performed in any order by any system.

As shown, a method 1000 begins at step 1002, wherein proxy engine 306 may receive a request for handle data from a first client and does not have the handle data cached. At step 1004, proxy engine 306 may obtain an encrypted symmetric key and symmetric key identifier from handle system 130 and an encrypted version of the requested handle data, encrypted using the symmetric key. In performing step 1004, the first client may have provided an access token previously provided to that client by an authentication and authorization service trusted by handle system 130 and client may also provide client's public key.

If client does not provide an access token or public key, proxy engine 306 may attempt to retrieve client's access token or client's public key from a cache. Proxy engine 306 may initiate a client authentication and authorization flow if proxy engine 306 cannot identify client's access token either on client's request or from a cache managed by proxy engine 306. The authentication and authorization flow may result in client's access token being provided to proxy engine 306. Proxy engine 306 may then send a request to handle system 130 and include with the request the client's access token and client's public key. Handle system 130 may then uses the client's access token to determine that the client is authorized to access the handle. If handle data is subject to access policies, handle system 130 may encrypt the handle data with a symmetric key associated with the handle data, and encrypt the symmetric key with the public key of the client, and return to proxy engine 306 the encrypted handle, the encrypted symmetric key and a key identifier for the symmetric key. If the handle data is not subject to access policies, handle system 130 may provide unencrypted handle data to proxy engine 306. Proxy engine 306 may then provide to the client the handle data, either encrypted or unencrypted, and the encrypted symmetric key and symmetric key identifier if provided to proxy engine 306 by handle system 130. In conjunction with these operations, handle system 130 may generate the symmetric key used for encrypting handle or may use a previously generated symmetric key. Some of these operations are further described in the remaining steps of the method 1000.

At step 1006, proxy engine 306 may cache the handle data received at step 1004. If the handle data was encrypted, proxy engine 306 may index the encrypted handle data using a symmetric key identifier associated with the symmetric key used to encrypt the handle data. At step 1008, proxy engine 306 may return the encrypted object and the encrypted symmetric key to the first client 110.

At step 1010, proxy engine 306 may receive a request for the handle data from a second client 110. The second client 110 may have previously authenticated with handle system 130 and been authorized to access handle data with the same access policies as the requested handle data. In that regard, the second client 110 may already possess a copy of the symmetric key used by handle system 130 to encrypt all handle data subject to the same access policy. At step 1012, proxy engine 306 may retrieve the encrypted version of the handle data from the cache. At step 1014, proxy engine 306 may return the encrypted version of the handle data to the second client 110.

According to an embodiment, proxy engine 306 may track which clients have previously been given a particular symmetric key and use this tracking information to inform whether proxy engine 306 should notify a client that they should resubmit a request along with their access token and public key so as to be authorized to access handle data and consequently receive back the symmetric key used to encrypt the handle data. In some cases, a second client may receive from proxy engine 306 handle data encrypted with a symmetric key not in possession of a second client. In such cases, the second client may provide an access token and a public key to proxy engine 306 in a second request for handle data so that proxy engine 306 will interact with handle system 130 to determine if the second client is authorized to retrieve the handle data. Proxy engine 306 may return an encrypted symmetric key and symmetric key identifier to the client if the client is authorized to retrieve the handle data and will return a status indicating the client was not authorized if the client is not authorized to retrieve the handle data. According to an embodiment, the method 1000 described herein generally corresponds to the caching model discussed in conjunction with FIGS. 6A-6B.

Figure 11:
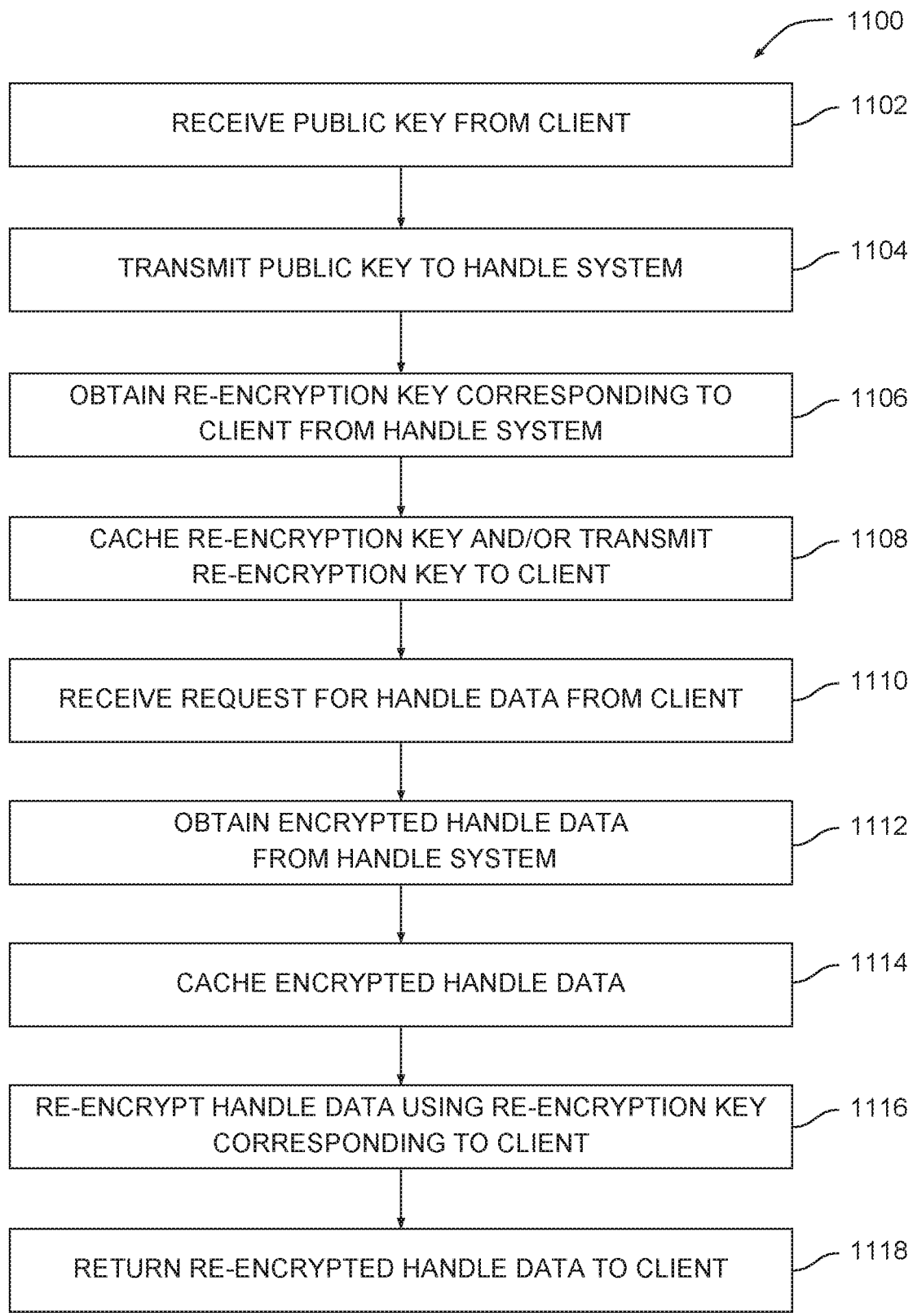
FIG. 11 is a flow diagram of method steps for caching and re-encrypting handle data, according to various embodiments.

FIG. 11 is a flow diagram of method steps for caching and re-encrypting digital objects, according to various embodiments. Although the method steps are described in conjunction with the systems of FIGS. 1-8, the method steps can be performed in any order by any system.

As shown, a method 1100 begins at step 1102, where proxy engine 306 has received a public key from a client 110 and then transmitted this key to handle system 130. Handle system 130 may use this public key to generate a re-encryption key that will allow client 110 to decrypt handle data with the private key of client 110 when handle data is initially encrypted with the public key of the handle system 130 and re-encrypted with the re-encryption key. Handle system 130 may process requests for re-encryption keys as part of a process separate from handle data request processing. Handle system 130 may also dynamically generate re-encryption keys on an as-needed basis based on a client's public key, according to an embodiment.

Next, at step 1104, proxy engine 306 may transmit the public key to handle system 130. In response, handle system 130 may generate a re-encryption key for client 110 using a private key associated with handle system 130 and the public key associated with the client 110. At step 1106, proxy engine 306 may obtain the re-encryption key corresponding to client 110 from handle system 130. At step 1108, proxy engine 306 may cache the re-encryption key and/or transmits re-encryption key to client 110.

At step 1110, proxy engine 306 may receive a request for handle data from the client 110. At step 1112, proxy engine 306 may obtain an encrypted version of the handle data from handle system 130. Handle system 130 may encrypt the handle data using, for example, a public key associated with handle system 130 or an LHR 402 included therein. At step 1114, proxy engine 306 may cache the encrypted version of the handle data. At step 1116, proxy engine 306 may extract the re-encryption key cached at step 1108 and then re-encrypt the encrypted handle data using that re-encryption key. At step 1118, proxy engine 306 may return the re-encrypted handle data to client 110. Client 110 may then decrypt the handle data using client's private key along with public/private key decryption techniques. According to an embodiment, the method 1100 described herein may generally correspond to the caching model discussed in conjunction with FIGS. 7A-7B.

Figure 12:
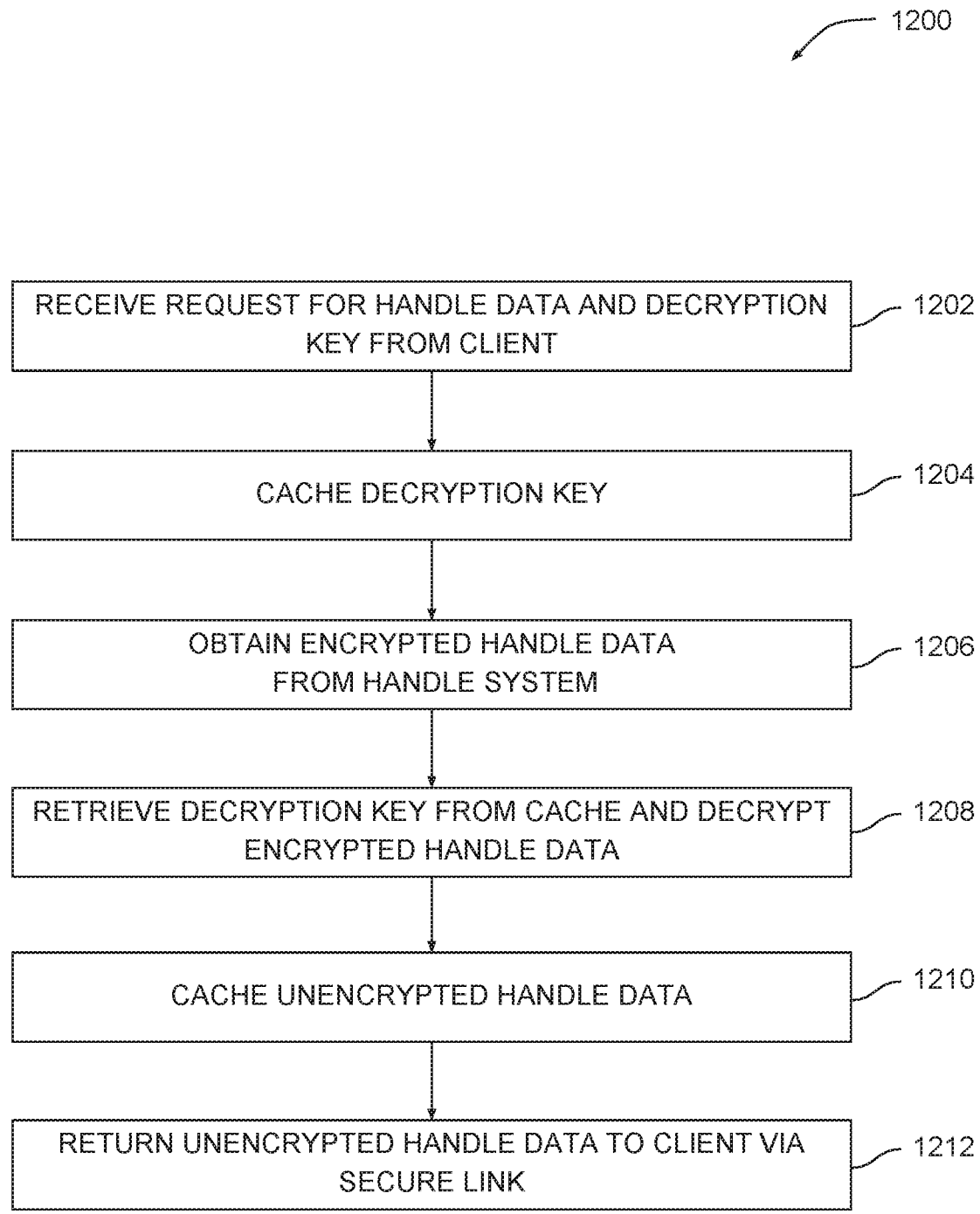
FIG. 12 is a flow diagram of method steps for decrypting cached handle data, according to various embodiments.

FIG. 12 is a flow diagram of method steps for decrypting cached handle data, according to various embodiments. Although the method steps are described in conjunction with the systems of FIGS. 1-8, the method steps can be performed in any order by any system.

As shown, a method 1200 may begin at step 1202, where proxy engine 306 receives from a client 110 a request for handle data. Proxy engine 306 may also determine whether client 110 is authorized to access the requested handle data. Proxy engine 306 may determine whether the requested handle data is cached. At step 1204, proxy engine 306 may cache the decryption key. At step 1206, if proxy engine 306 has determined that client 110 is authorized to access the requested handle data and that data is not cached, proxy engine 306 may obtain the handle data from handle system 130. At step 1208, proxy engine 306 may retrieve the decryption key from the cache and then decrypt the encrypted object. At step 1210, proxy engine 306 may cache the handle data provided by handle system 130 for future access. If the handle data is cached, proxy engine 306 may retrieve the cached handle data. At step 1212, if client 110 was authorized to retrieve the handle data, proxy engine 306 may return the handle data to client 110 via a secure link. According to an embodiment, the method 1200 described herein may generally correspond to the caching model discussed in conjunction with FIG. 8. According to an embodiment, the method 1200 described herein may be implemented when proxy server 120 is considered "trusted."

Referring generally to FIGS. 9-12, proxy engine 306 may perform any of the methods 900, 1000, 1100, and 1200 in order to implement any of the caching methods discussed above in conjunction with FIGS. 5A-5C, 6A-6B, 7A-7B, and 8, respectively. In addition, proxy engine 306 may perform these methods in conjunction with one another in order to implement some or all caching models simultaneously.

According to an embodiment, a digital object architecture (DOA) infrastructure may include a handle system that stores handle data and a proxy server that caches that handle data for rapid access. A client connects to the proxy server to request access to given handle data. If the handle data does not have access restrictions and is currently cached, then the proxy server returns the handle data to the client without needing to access the handle system. If the handle data does not have access restrictions and is not cached, then the proxy server obtains the handle data from the handle system, caches a copy of the handle data for future access, and provides the handle data to the client. The client may use the handle data to access an associated digital object. The proxy server may also support authentication and authorization operations with the handle system on behalf of the client to provide access to handle data having access restrictions.

A DOA infrastructure that includes the described proxy server may provide efficient (e.g., in terms of speed of access) access to handle data and related digital resources. Accordingly, the disclosed proxy server may transform a conventional DOA infrastructure, thereby conferring a significant technological advancement. Additionally, because the proxy server supports authentication and authorization procedures in conjunction with the DOA handle system, existing security restrictions on handle data can be maintained while also expediting access to those resources.

1. In some embodiments, a computer-implemented method for caching handle data for a digital object having access restrictions comprises determining that access to a first handle data is restricted based on a first request received from a first client machine, determining that the first client machine is authorized to access the first handle data, retrieving an encrypted version of the first handle data based on a first handle included in the first request, and storing the encrypted version of the first handle data in a first cache memory for subsequent access by the first client machine.
2. The computer-implemented method of clause 1, which further comprises transmitting the encrypted version of the first handle data to the first client machine in response to the first request.
3. The computer-implemented method of clause 1 or 2, wherein the determining that access to the first handle data is restricted comprises determining that the first request includes an access token that includes an embedded public key.
4. The computer-implemented method of any of clauses 1-3, wherein the encrypted version of the first handle data is encrypted using a public key associated with the first client machine, and wherein the first client machine decrypts the encrypted version of the first handle data using a private key corresponding to the public key.
5. The computer-implemented method of any of clauses 1-4, which further comprises determining that access to a second handle data is unrestricted based on a second request received from the first client machine, retrieving the second handle data from the first cache memory, and transmitting the second handle data to the first client machine in response to the second request.

6. The computer-implemented method of any of clauses 1-5, which further comprises transmitting the encrypted version of the first handle data to the first client machine in response to the first request, wherein the encrypted version of the first handle data is encrypted using a first symmetric key that is shared with the first client machine, and wherein the first client machine decrypts the encrypted version of the first handle data using the first symmetric key.

7. The computer-implemented method of any of clauses 1-6, wherein the encrypted version of the first handle data is encrypted using a first symmetric key that is shared with a second client machine, and which further comprises in response to receiving a second request from the second client machine, determining that the encrypted version of the first handle data is stored in the first cache memory, and transmitting the encrypted version of the first handle data to the second client machine in response to the second request, wherein the second client machine decrypts the encrypted version of the first handle data using the first symmetric key.

8. The computer-implemented method of any of clauses 1-7, wherein the encrypted version of the first handle data is encrypted using a public key associated with a server machine, and which further comprises obtaining, from the server machine, a re-encryption key associated with the first client machine, wherein the server machine generates the re-encryption key using a public key associated with the first client machine and a private key associated with the server machine, re-encrypting the encrypted version of the first handle data using the re-encryption key to generate first re-encrypted handle data, and transmitting the first re-encrypted handle data to the first client machine in response to the first request, wherein the first client machine decrypts the first re-encrypted handle data using the re-encryption key.

9. The computer-implemented method of any of clauses 1-8, which further comprises decrypting the encrypted version of the first handle data using a decryption key associated with the first client machine to generate the first handle data, and transmitting the first handle data to the first client machine in response to the first request.

10. The computer-implemented method of any of clauses 1-9, wherein the digital object is included in a digital object architecture (DOA) infrastructure.

11. In some embodiments, a non-transitory computer-readable medium storing program instructions that, when executed by a processor, cause the processor to cache handle data having access restrictions by performing the steps of determining that access to a first handle data is restricted based on a first request received from a first client machine, determining that the first client machine is authorized to access the first handle data, retrieving an encrypted version of the first handle data based on a first handle included in the first request, and storing the encrypted version of the first handle data in a first cache memory for subsequent access by the first client machine.

12. The non-transitory computer-readable medium of clause 11, which further comprises the step of transmitting the encrypted version of the first handle data to the first client machine in response to the first request.

13. The non-transitory computer-readable medium of clauses 11 or 12, wherein the step of determining that the first client machine is authorized to access the first handle data comprises obtaining access credentials from the first client machine, transmitting the access credentials to a server machine for authentication and authorization, and receiving an encrypted access token from the server machine indicating that the first client machine is authenticated and authorized to access the first handle data.

14. The non-transitory computer-readable medium of any of clauses 11-13, which further comprises the steps of obtaining an encrypted access token from a server machine that stores the first handle data, and transmitting the encrypted access token to the first client machine, wherein the first client machine decrypts the access token and transmits the access token to the server machine to access the first handle data.

15. The non-transitory computer-readable medium of any of clauses 11-14, which further comprising the steps of determining that access to a second handle data is unrestricted based on a second request received from the first client machine, retrieving the second handle data from the first cache memory, and transmitting the second handle data to the first client machine in response to the second request.

16. The non-transitory computer-readable medium of any of clauses 11-15, which further comprises the step of transmitting the encrypted version of the first handle data to the first client machine in response to the first request, wherein the encrypted version of the first handle data is encrypted using a first symmetric key that is shared with the first client machine, and wherein the first client machine decrypts the encrypted version of the first handle data using the first symmetric key.

17. The non-transitory computer-readable medium of any of clauses 11-16, wherein the encrypted version of the first handle data is encrypted using a first symmetric key that is shared with a second client machine, and which further comprises the steps of in response to receiving a second request from the second client machine, determining that the encrypted version of the first handle data is stored in the first cache memory, and transmitting the encrypted version of the first handle data to the second client machine in response to the second request, wherein the second client machine decrypts the encrypted version of the first handle data using the first symmetric key.

18. In some embodiments, a system comprises a memory that includes a proxy engine, a first database storing cached handle data related to one or more digital objects, and a second database storing one or more keys for encrypting or decrypting the handle data, and a processor that, when executing the proxy engine, is configured to retrieve an encrypted version of first handle data based on a first handle identifier included in a request received from a first client machine, store the encrypted version of the first handle data in the first database for subsequent access by the first client machine or by one or more other client machines, and store an encrypted version of a first key in the second database, wherein a decrypted version of the first key is used by the first client machine or the one or more other client machines to decrypt the encrypted version of the first handle data.

19. The system of clause 18, wherein the processor is further configured to determine that access to the first handle data is restricted based on a first request received from the first client machine, determine that the first client machine is authorized to access the first handle data, and in response to determining that the first client machine is authorized to access the first handle data, retrieve the encrypted version of the first key for storage in the second database.

20. The system of clause 18 or 19, wherein the processor is further configured to receive a second request from a second client machine included in the one or more other client machines, access the first database to retrieve the encrypted version of the first handle data, access the second database to retrieve the encrypted version of the first key, and transmit the encrypted version of the first handle data and the encrypted version of the first key to the second client machine in response to the second request.

Any and all combinations of any of the claim elements recited in any of the claims and/or any elements described in this application, in any fashion, fall within the contemplated scope of the present invention and protection.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method for caching handle data for a digital object having access restrictions, the method comprising:
    determining, by a proxy server and based on a first request received from a first client machine, that access to first handle data is restricted, wherein the first handle data is identified with a first handle identifier and is associated with the digital object stored in a repository of a handle system;
    determining that the first client machine is authorized to access the first handle data;
    retrieving, by the proxy server and based on the first handle identifier included in the first request, an encrypted version of the first handle data that is stored in the repository; and
    upon retrieving the encrypted version of the first handle data, storing the encrypted version of the first handle data in a first cache memory of the proxy server for subsequent access by the first client machine.

2. The computer-implemented method of claim 1, further comprising transmitting, by the proxy server and in response to the first request, the encrypted version of the first handle data to the first client machine.

3. The computer-implemented method of claim 1, wherein the determining that access to the first handle data is restricted comprises determining that the first request includes an access token that includes an embedded public key.

4. The computer-implemented method of claim 1, wherein:
    the encrypted version of the first handle data is encrypted using a public key associated with the first client machine; and the first client machine decrypts the encrypted version of the first handle data using a private key corresponding to the public key.

5. The computer-implemented method of claim 1, further comprising:
determining, by the proxy server and based on a second request received from the first client machine, that access to second handle data is unrestricted;
retrieving the second handle data from the first cache memory; and
transmitting, by the proxy server and in response to the second request, the second handle data to the first client machine.

6. The computer-implemented method of claim 1, further comprising:
transmitting, to the first client machine and in response to the first request, the encrypted version of the first handle data,
wherein the encrypted version of the first handle data is encrypted using a first symmetric key that is shared with the first client machine, and
wherein the first client machine decrypts the encrypted version of the first handle data using the first symmetric key.

7. The computer-implemented method of claim 1, wherein the encrypted version of the first handle data is encrypted using a first symmetric key that is shared with a second client machine, and further comprising:
in response to receiving a second request from the second client machine, determining that the encrypted version of the first handle data is stored in the first cache memory; and
transmitting, to the second client machine and in response to the second request, the encrypted version of the first handle data,
wherein the second client machine decrypts the encrypted version of the first handle data using the first symmetric key.

8. The computer-implemented method of claim 1, wherein the encrypted version of the first handle data is encrypted using a public key associated with the repository, and further comprising:
obtaining, from the repository, a re-encryption key associated with the first client machine, wherein the repository generates the re-encryption key using a public key associated with the first client machine and a private key associated with the repository;
re-encrypting the encrypted version of the first handle data using the re-encryption key to generate first re-encrypted handle data; and
transmitting, to the first client machine and in response to the first request, the first re-encrypted handle data,
wherein the first client machine decrypts the first re-encrypted handle data using the re-encryption key.

9. The computer-implemented method of claim 1, further comprising:
decrypting the encrypted version of the first handle data using a decryption key associated with the first client machine to generate the first handle data; and
transmitting, to the first client machine and in response to the first request, the first handle data.

10. The computer-implemented method of claim 1, wherein the digital object is included in a digital object architecture (DOA) infrastructure that includes the handle system.

11. One or more non-transitory computer-readable media storing program instructions that, when executed by one or more processors, cause the one or more processors to cache handle data having access restrictions by performing the steps of:

determining, by a proxy server and based on a first request received from a first client machine, that access to first handle data is restricted, wherein the first handle data is identified with a first handle identifier and is associated with the digital object stored in a repository of a handle system;
determining that the first client machine is authorized to access the first handle data;
retrieving, by the proxy server and based on the first handle identifier included in the first request, an encrypted version of the first handle data that is stored in the repository; and
upon retrieving the encrypted version of the first handle data, storing the encrypted version of the first handle data in a first cache memory of the proxy server for subsequent access by the first client machine.

12. The one or more non-transitory computer-readable media of claim 11, further comprising instructions that, when executed by the one or more processors, cause the one or more processors to perform the step of transmitting, by the proxy server and in response to the first request, the encrypted version of the first handle data to the first client machine.

13. The one or more non-transitory computer-readable media of claim 11, wherein the step of determining that the first client machine is authorized to access the first handle data comprises:
obtaining access credentials from the first client machine;
transmitting the access credentials to the repository for authentication and authorization; and
receiving an encrypted access token from the repository indicating that the first client machine is authenticated and authorized to access the first handle data.

14. The one or more non-transitory computer-readable media of claim 11, further comprising instructions that, when executed by the one or more processors, cause the one or more processors to perform the steps of:
obtaining an encrypted access token from the repository that stores the first handle data; and
transmitting the encrypted access token to the first client machine,
wherein the first client machine (i) decrypts the encrypted access token to generate an access token (ii) and transmits the access token to the repository to access the first handle data.

15. The one or more non-transitory computer-readable media of claim 11, further comprising instructions that, when executed by the one or more processors, cause the one or more processors to perform the steps of:
determining, by the proxy server and based on a second request received from the first client machine, that access to second handle data is unrestricted;
retrieving the second handle data from the first cache memory; and
transmitting, by the proxy server and in response to the second request, the second handle data to the first client machine.

16. The one or more non-transitory computer-readable media of claim 11, further comprising instructions that, when executed by the one or more processors, cause the one or more processors to perform the step of:
transmitting, to the first client machine and in response to the first request, the encrypted version of the first handle data,
wherein the encrypted version of the first handle data is encrypted using a first symmetric key that is shared with the first client machine, and wherein the first client machine decrypts the encrypted version of the first handle data using the first symmetric key.

17. The one or more non-transitory computer-readable media of claim 11, wherein the encrypted version of the first handle data is encrypted using a first symmetric key that is shared with a second client machine, and further comprising instructions that, when executed by the one or more processors, cause the one or more processors to perform the steps of:

in response to receiving a second request from the second client machine, determining that the encrypted version of the first handle data is stored in the first cache memory; and transmitting, to the second client machine and in response to the second request, the encrypted version of the first handle data, wherein the second client machine decrypts the encrypted version of the first handle data using the first symmetric key.

18. A proxy server, comprising:
a memory that includes:
   a proxy engine that responds to requests for first handle data for a digital object, wherein the first handle data is identified with a first handle identifier and is associated with the digital object stored in a repository of a handle system,
   a first database storing cached handle data related to one or more digital objects, and
   a second database storing one or more keys for encrypting or decrypting the cached handle data; and
   a processor that, when executing the proxy engine, is configured to:
   upon retrieval of the encrypted version of the first handle data:
   retrieve, from the repository and based on the first handle identifier included in a first request originated from a first client machine, an encrypted version of the first handle data,
   store the encrypted version of the first handle data in the first database for subsequent access by the first client machine or by one or more other client machines, and
   store an encrypted version of a first key in the second database, wherein a decrypted version of the first key is used by the first client machine or the one or more other client machines to decrypt the encrypted version of the first handle data.

19. The proxy server of claim 18, wherein the processor is further configured to:

determine, based on the first request received from the first client machine, that access to the first handle data is restricted;

determine that the first client machine is authorized to access the first handle data; and in response to the determination that the first client machine is authorized to access the first handle data, retrieve the encrypted version of the first key for storage in the second database, wherein the encrypted version of the first key is stored in the repository.

20. The proxy server of claim 18, wherein the processor is further configured to:

receive a second request from a second client machine included in the one or more other client machines;

access the first database to retrieve the encrypted version of the first handle data;

access the second database to retrieve the encrypted version of the first key; and transmit in response to the second request:
   the encrypted version of the first handle data, and
   the encrypted version of the first key to the second client machine.

* * * * *